US011597467B2

(12) United States Patent
Haraguchi et al.

(10) Patent No.: US 11,597,467 B2
(45) Date of Patent: Mar. 7, 2023

(54) PARKING BRAKE APPARATUS FOR SADDLED VEHICLE

(71) Applicant: HONDA MOTOR CO., LTD., Tokyo (JP)

(72) Inventors: Hideaki Haraguchi, Wako (JP); Koshi Nakamura, Wako (JP); Hayato Yamashiro, Wako (JP); Akihito Kawamura, Wako (JP); Takuya Otsuka, Wako (JP); Hiroyuki Sasazawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 481 days.

(21) Appl. No.: 16/813,181

(22) Filed: Mar. 9, 2020

(65) Prior Publication Data

US 2020/0290699 A1 Sep. 17, 2020

(30) Foreign Application Priority Data

Mar. 12, 2019 (JP) .............................. JP2019-044927

(51) Int. Cl.
*B62K 23/04* (2006.01)
*B62J 6/24* (2020.01)
(Continued)

(52) U.S. Cl.
CPC .............. *B62K 23/04* (2013.01); *B60T 7/085* (2013.01); *B60T 7/12* (2013.01); *B60T 13/746* (2013.01);
(Continued)

(58) Field of Classification Search
None
See application file for complete search history.

(56) References Cited

U.S. PATENT DOCUMENTS 4,286,699 A 9/1981 Pawelka
4,607,733 A * 8/1986 Dodge .................... B62L 3/023
74/489
(Continued)

FOREIGN PATENT DOCUMENTS

DE 102009047127 A1 * 5/2011 ............. F16D 65/18
DE 202018105633 U1 * 11/2018 ........... F16D 55/226
(Continued)

OTHER PUBLICATIONS

Extended European search report dated Jul. 23, 2020 issued in the corresponding EP Patent Application 20161758.6.

*Primary Examiner* — Melanie Torres Williams
(74) *Attorney, Agent, or Firm* — Carrier Shende & Associates, P.C.; Joseph P. Carrier; Fulchand P. Shende

(57) ABSTRACT

To provide a parking brake apparatus for a saddled vehicle actuated in response to a reverse rotation on a throttle grip which is set in a simplified structure. A parking brake apparatus for a saddled vehicle includes a parking brake caliper configured to restrict a rotation of a rear wheel while the motorcycle is parked; a steering handle configured to steer a front wheel; and a throttle grip mounted on the steering handle and configured to control output of a power unit. The control unit actuates the parking brake caliper by a motor when at least the throttle grip is reversely rotated and the vehicle speed is zero. The throttle grip being reversely rotated is detected according to information from a throttle position sensor which is interlocked with the throttle grip.

20 Claims, 14 Drawing Sheets

(51) Int. Cl.
*B60T 7/08* (2006.01)
*B60T 7/12* (2006.01)
*B60T 13/74* (2006.01)
*B62L 1/00* (2006.01)
*B62L 3/02* (2006.01)
*F16D 65/18* (2006.01)
*G05G 1/015* (2008.04)
*F16D 121/24* (2012.01)
*F16D 125/40* (2012.01)

(52) U.S. Cl.
CPC .  *B62J 6/24* (2020.02); *B62L 1/00* (2013.01); *B62L 3/026* (2013.01); *F16D 65/183* (2013.01); *G05G 1/015* (2013.01); *B60T 2220/00* (2013.01); *B60T 2250/00* (2013.01); *B60T 2250/04* (2013.01); *F16D 2121/24* (2013.01); *F16D 2125/40* (2013.01)

(56) References Cited

U.S. PATENT DOCUMENTS

| | | | |
|---|---|---|---|
| 6,371,890 B1 | 4/2002 | Schell | |
| 2010/0308644 A1* | 12/2010 | Ishikawa | B60T 7/14 303/10 |

FOREIGN PATENT DOCUMENTS

| | | | | |
|---|---|---|---|---|
| EP | 3330513 A1 * | 6/2018 | ............ | B62K 23/04 |
| JP | H02-175484 A | 7/1990 | | |
| WO | 2010/133656 A1 | 11/2010 | | |
| WO | WO-2010133656 A1 * | 11/2010 | ............... | B60T 7/10 |
| WO | WO-2019021246 A1 * | 1/2019 | ............ | B60T 13/741 |

\* cited by examiner

PARKING BRAKE APPARATUS FOR SADDLED VEHICLE

BACKGROUND

1. Technical Field

The present invention relates to a parking brake apparatus for a saddled vehicle. Particularly, the present invention relates to a parking brake apparatus for a saddled vehicle which continuously prohibits the rotation of a wheel in parking.

2. Description of the Background

What is known conventionally is a saddled vehicle which includes, in addition to a brake lever and a brake pedal for operating a brake apparatus which applies braking force against the rotation of a wheel, a third brake operating element.

Patent Literature 1 discloses a throttle grip provided at a steering handle of a motorcycle. By being reversely rotated from a neutral position, the throttle grip actuates a front wheel brake.

CITATION LIST

Patent Literature

Patent Literature 1: Japanese Unexamined Patent Application No. 2-175484

BRIEF SUMMARY

Here, a saddled vehicle in which drive power is transferred from a drive power source to a transmission via a centrifugal clutch or an electronic control clutch often includes a parking brake for continuously prohibiting the rotation of a wheel because the clutch is turned off in parking or when the electric power source is turned off. Here, what Patent Literature 1 discloses is a transmission member coupled to a throttle grip, which transmission member directly pushes a hydraulic master cylinder of a regular brake used during traveling. Patent Literature 1 is silent about use of the throttle grip as an operating element for the parking brake. Additionally, in the disclosure of Patent Literature 1, since the transmission member, a link mechanism and the like are disposed around the throttle grip, the structure around the throttle grip tends to be complicated.

An object of the present invention is to solve the conventional problem, and to provide a parking brake apparatus for a saddled vehicle actuated in response to a reverse operation on a throttle grip which is set in a simplified structure.

In order to achieve the above-described object, a first aspect of the present invention is: a parking brake apparatus for a saddled vehicle, including: a parking brake caliper (95, 111) configured to restrict a rotation of a rear wheel (WR) while a saddled vehicle (1) is parked; a steering handle (4) configured to steer a front wheel (WF); and a throttle grip (37) mounted on the steering handle (4) and configured to control output of a power unit (P). The throttle grip (37) being reversely rotated over a neutral position counter to a forward direction actuates the parking brake caliper (95, 111). The forward direction is for controlling the output of the power unit (P).

In a second aspect, the parking brake caliper (95, 111) is electrically driven by a motor (103). The parking brake apparatus further includes a control unit (200) configured to control actuation of the parking brake caliper (95, 111). The control unit (200) employs an actuation condition for the parking brake caliper (95, 111) that at least a vehicle speed (V) of the saddled vehicle (1) be zero and the throttle grip (37) be reversely rotated.

In a third aspect, the control unit (200) detects the throttle grip (37) being reversely rotated according to information from a throttle position sensor (43) interlocked with the throttle grip (37).

A fourth aspect further includes a regular brake configured to apply braking force to the front wheel (WF) and the rear wheel (WR) in response to an operation on a brake operating element (35, 206). The control unit (200) further employs an actuation condition for the parking brake caliper (95, 111) that the brake operating element (35, 206) be rotated.

A fifth aspect further includes a seat sensor (19) configured to detect a seated state of a driver. The control unit (200) further employs an actuation condition for the parking brake caliper (95, 111) that the seat sensor (19) detect the driver being seated.

A sixth aspect further includes a seat sensor (19) configured to detect a seated state of a driver. The power unit (P) includes a transmission (90) controlled by the control unit (200). When the vehicle speed (V) of the saddled vehicle (1) is zero; the brake operating element (35, 206) is being operated; the throttle grip (37) is being reversely rotated; and the seat sensor (19) is not detecting the driver being seated, the control unit (200) actuates the parking brake caliper (95, 111) if a gear stage of the transmission (90) is neutral (N).

A seventh aspect further includes: a seat sensor (19) configured to detect a seated state of a driver. The power unit (P) includes a transmission (90) controlled by the control unit (200). When the vehicle speed (V) of the saddled vehicle (1) is zero; the brake operating element (35, 206) is being operated; the throttle grip (37) is being reversely rotated; and the seat sensor (19) is not detecting the driver being seated, the control unit (200) changes a gear stage to neutral and then actuates the parking brake caliper (95, 111) if the gear stage is in an in-gear state other than neutral.

In an eighth aspect, the saddled vehicle (1) has a cruise control function for keeping the vehicle speed (V) at a set value. When the vehicle speed (V) exceeds zero, the throttle grip (37) being reversely rotated functions to cancel the cruise control function.

A ninth aspect further includes an ignition switch (204) configured to turn on and off power supply of the saddled vehicle (1). The control unit (200) provides selection of a manual mode in which the parking brake caliper (95, 111) is actuated in response to an operation on the throttle grip (37), and an automatic mode in which the parking brake caliper (95, 111) is actuated according to a predetermined condition without any operation on the throttle grip (37). The manual mode or the automatic mode being set is maintained irrespective of an operation on the ignition switch (204) unless the driver performs an operation for switching the mode.

A tenth aspect further includes a display part (88) configured to be actuated according to an operation state of the parking brake caliper (95, 111). When the manual mode is being selected, the control unit (200) causes the display part (88) to transit from a turned-off state to a turned-on state according to the operation of the parking brake caliper (95, 111). When the automatic mode is being selected, the control unit (200) further adds a blinking operation of the display part (88) in addition to the turned-on state and the turned-off state.

In an eleventh aspect, despite the ignition switch (204) being turned off, the control unit (200) maintains the turned-on state of the display part (88) if the parking brake caliper (95, 111) is in operation.

The first aspect is a parking brake apparatus for a saddled vehicle, including: a parking brake caliper (95, 111) configured to restrict a rotation of a rear wheel (WR) while a saddled vehicle (1) is parked; a steering handle (4) configured to steer a front wheel (WF); and a throttle grip (37) mounted on the steering handle (4) and configured to control output of a power unit (P). The throttle grip (37) being reversely rotated over a neutral position counter to a forward direction actuates the parking brake caliper (95, 111). The forward direction is for controlling the output of the power unit (P). This allows the driver to actuate the parking brake apparatus while gripping the steering handle, contributing to improving stability and safety in the driver's performing the operation. The throttle grip also functioning as an operating element for the parking brake eliminates the necessity of providing an operating element dedicated to the parking brake. This reduces the number of components and manufacturing costs, and improves the appearance of the saddled vehicle.

In the second aspect, the parking brake caliper (95, 111) is electrically driven by a motor (103). The parking brake apparatus further including a control unit (200) configured to control actuation of the parking brake caliper (95, 111). The control unit (200) employs an actuation condition for the parking brake caliper (95, 111) that at least a vehicle speed (V) of the saddled vehicle (1) be zero and the throttle grip (37) be reversely rotated. Thus, the present disclosure realizes restricting the actuation of the parking brake according to the state of the vehicle, which is not realized by the structure including the throttle grip and the parking brake mechanically coupled to each other. Specifically, the present disclosure realizes setting for preventing actuation of the parking brake caliper against the throttle grip being reversely rotated during traveling.

In the third aspect, the control unit (200) detects the throttle grip (37) being reversely rotated according to information from a throttle position sensor (43) interlocked with the throttle grip (37). This contributes to improving flexibility in design by the simplified structure around the throttle grip, as compared to the structure including the transmission member and the link mechanism coupled to the throttle grip. Specifically, the structure around the throttle grip is simplified in that the throttle position sensor housed in a handle is directly rotated with the throttle grip, and the throttle position sensor provided at a throttle body is rotated by a wire coupled to the throttle grip.

The fourth aspect further includes a regular brake configured to apply braking force to the front wheel (WF) and the rear wheel (WR) in response to an operation on a brake operating element (35, 206). The control unit (200) further employs an actuation condition for the parking brake caliper (95, 111) that the brake operating element (35, 206) be rotated. Accordingly, when the throttle grip is reversely rotated with the vehicle speed being zero, the parking brake apparatus is not actuated unless the regular brake is operated. This realizes actuation control which clearly reflects the operation intention of the driver.

The fifth aspect further includes a seat sensor (19) configured to detect a seated state of a driver. The control unit (200) further employs an actuation condition for the parking brake caliper (95, 111) that the seat sensor (19) detect the driver being seated. Accordingly, the actuation control is exerted when suitable state for actuating the parking brake is determined employing the information of the seat sensor in addition to the operation state of the vehicle speed and the regular brake. In detail, when the driver is seated, the parking brake is actuated because the driver's operation intension is clear. On the other hand, when the driver is not seated, for example, the driver who is gripping the steering handles to wheel the vehicle may possibly unintentionally reversely rotate the throttle grip. Hence, the parking brake is prevented from actuating in this case.

The sixth aspect further includes a seat sensor (19) configured to detect a seated state of a driver. The power unit (P) includes a transmission (90) controlled by the control unit (200). When the vehicle speed (V) of the saddled vehicle (1) is zero; the brake operating element (35, 206) is being operated; the throttle grip (37) is being reversely rotated; and the seat sensor (19) is not detecting the driver being seated, the control unit (200) actuates the parking brake caliper (95, 111) if a gear stage of the transmission (90) is neutral (N). Accordingly, the parking brake is actuated despite the in-gear state, because the driver is seated and hence ready to re-start.

The seventh aspect further includes: a seat sensor (19) configured to detect a seated state of a driver. The power unit (P) includes a transmission (90) controlled by the control unit (200). When the vehicle speed (V) of the saddled vehicle (1) is zero; the brake operating element (35, 206) is being operated; the throttle grip (37) is being reversely rotated; and the seat sensor (19) is not detecting the driver being seated, the control unit (200) changes a gear stage to neutral and then actuates the parking brake caliper (95, 111) if the gear stage is in an in-gear state other than neutral. Accordingly, when the driver is not seated, the parking brake can be actuated under the added condition that the gear stage be neutral. This prevents actuation of the parking brake in the in-gear state.

In the eighth aspect, the saddled vehicle (1) has a cruise control function for keeping the vehicle speed (V) at a set value. When the vehicle speed (V) exceeds zero, the throttle grip (37) being reversely rotated functions to cancel the cruise control function. Thus, two different functions are realized with the reverse rotation on the throttle grip according to the vehicle speed. This further improves convenience of the saddled vehicle.

The ninth aspect further includes an ignition switch (204) configured to turn on and off power supply of the saddled vehicle (1). The control unit (200) provides selection of a manual mode in which the parking brake caliper (95, 111) is actuated in response to an operation on the throttle grip (37), and an automatic mode in which the parking brake caliper (95, 111) is actuated according to a predetermined condition without any operation on the throttle grip (37). The manual mode or the automatic mode being set is maintained irrespective of an operation on the ignition switch (204) unless the driver performs an operation for switching the mode. Thus, the turning on or off of the ignition switch will not change the operation mode, preventing from the driver from feeling awkward in operating the parking brake.

The tenth aspect further includes a display part (88) configured to be actuated according to an operation state of the parking brake caliper (95, 111). When the manual mode is being selected, the control unit (200) causes the display part (88) to transit from a turned-off state to a turned-on state according to the operation of the parking brake caliper (95, 111). When the automatic mode is being selected, the control unit (200) further adds a blinking operation of the display part (88) in addition to the turned-on state and the turned-off state. Thus, the single display part is capable of indicating the operating/canceled state of the parking brake caliper and the select state of the manual mode/automatic mode.

In the eleventh aspect, despite the ignition switch (204) being turned off, the control unit (200) maintains the turned-on state of the display part (88) if the parking brake caliper (95, 111) is in operation. Accordingly, in the structure without an operating element dedicated to actuating the parking brake, the operation state of the parking brake is indicated despite the ignition switch being turned off.

DETAILED DESCRIPTION

Figure 1:
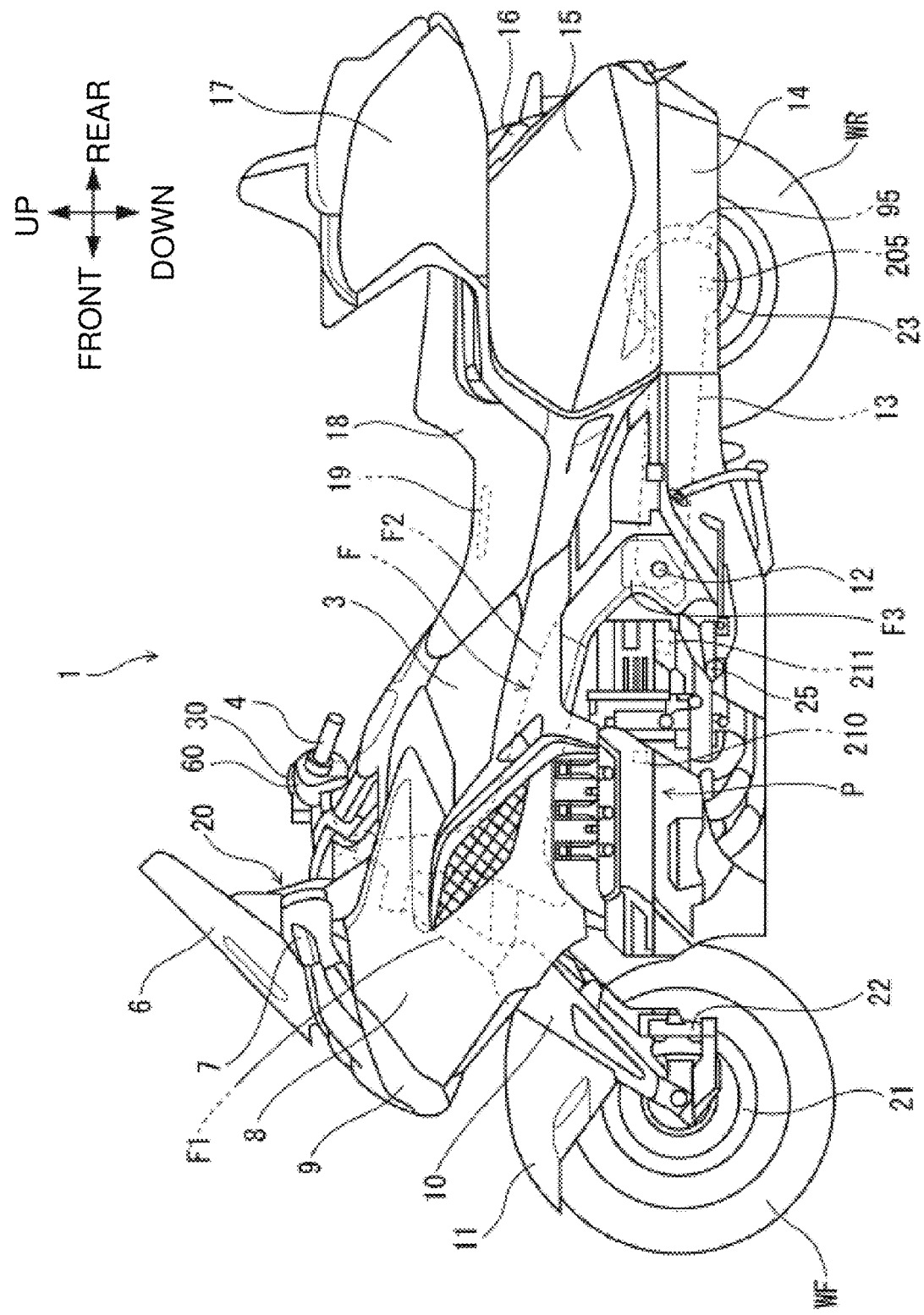
FIG. 1 is a left side view of a motorcycle to which a parking brake apparatus according to one embodiment of the present invention.

In the following, with reference to the drawings, a detailed description will be given of preferred embodiments of the present invention. FIG. 1 is a left side view of a motorcycle 1 to which a parking brake apparatus according to one embodiment of the present invention is applied. The motorcycle 1 is a saddled vehicle in which drive power from a power unit P is transferred to a rear wheel WR via a drive shaft. Main frames F2 included in a vehicle body frame F support, at their front ends, a head pipe F1 so as to be shiftable vertically. The head pipe F1 swingably supports a front arm 10 which pivotally supports a front wheel WF. Steering handles 4 connected to the front arm 10 via a link mechanism are swingably pivotally supported on the front upper edge of the vehicle body frame F. Mounted on the front arm 10 are a front fender 11 which covers over the front wheel WF and a front-wheel brake caliper 22. The front-wheel brake caliper 22 applies braking force to a front-wheel brake disc 21 which integrally rotate with the front wheel WF.

To the bottom of the rear edge of the pair of right and left main frames F2, a pivot frame F3 is connected. The pivot frame F3 is provided with a pivot 12 which swingably pivotally supports the front end of a swingarm 13. On the front lower side of the pivot frame F3, a pair or right and left foot steps 25 is provided. In front of the right foot step 25, a brake pedal configured to actuate a rear-wheel brake is provided.

Into the swingarm 13 which is hollow, a drive shaft is inserted. To the rear wheel WR pivotally supported at the rear end of the swingarm 13, a rear-wheel brake disc 23 which receives braking force from a rear-wheel brake caliper 95 is fixed. The rear-wheel brake caliper 95 according to the present embodiment functions as a regular brake for applying braking force to the rear wheel WR in order to decelerate during traveling, and also functions as a parking brake for continuously applying braking force to the rear wheel WR during parking.

The head pipe F1 has its front side covered with a front cowl 8 which supports a windshield screen 6, a headlamp 9 and the like. The front cowl 8 is provided with a pair of right and left front flasher lamp-integrated rearview mirror apparatuses 7. In front of the steering handles 4 and behind the windshield screen 6, a meter apparatus 20 is disposed. On the right and left steering handles 4, switch boxes 30, 60 each equipped with a plurality of switches are respectively mounted.

Above the main frames F2, a fuel tank cover 3 is disposed. Behind the fuel tank cover 3, a tandem seat 18 on which the driver and the passenger are seated is disposed. On the front half side of the seat 18, a thin plate-like seat sensor 19 for detecting the driver's seated state is embedded.

The power unit P integrally incorporating a flat-six engine and a multi-stage transmission is suspended from the vehicle body frame F, and exhaust gas from the engine is discharged from the rear end of a muffler 14 on the vehicle rear side. The power unit P is provided with an engine speed sensor 210 configured to detect the speed of the engine, and a neutral sensor 211 configured to determine whether or not the transmission is at the neutral position where the transmission is not in the in-gear state. At the rear end of the swingarm 13, a vehicle speed sensor 205 configured to detect vehicle speed V of the motorcycle 1 from the rotation of the rear wheel WR is provided.

In the power unit P according to the present embodiment, without any clutch or shift pedal operations, automatic shifting according to the vehicle speed V or the engine speed Ne is realizes by automatic control, which is exerted on a dual clutch provided on the main shaft of the transmission and a shift drum configured to change the meshing state of the transmission gears. This provides traveling in the automatic mode in which no shifting operation is necessary, or in the manual mode in which the gear position is shiftable by the driver's operating shift switches.

Behind the seat 18, a top case 17 as a storage is disposed. Below the top case 17, a pair of right and left pannier cases 15 are attached. Between the right and left pannier cases 15, a tail lamp apparatus 16 including a rear flasher lamp is disposed.

Figure 2:
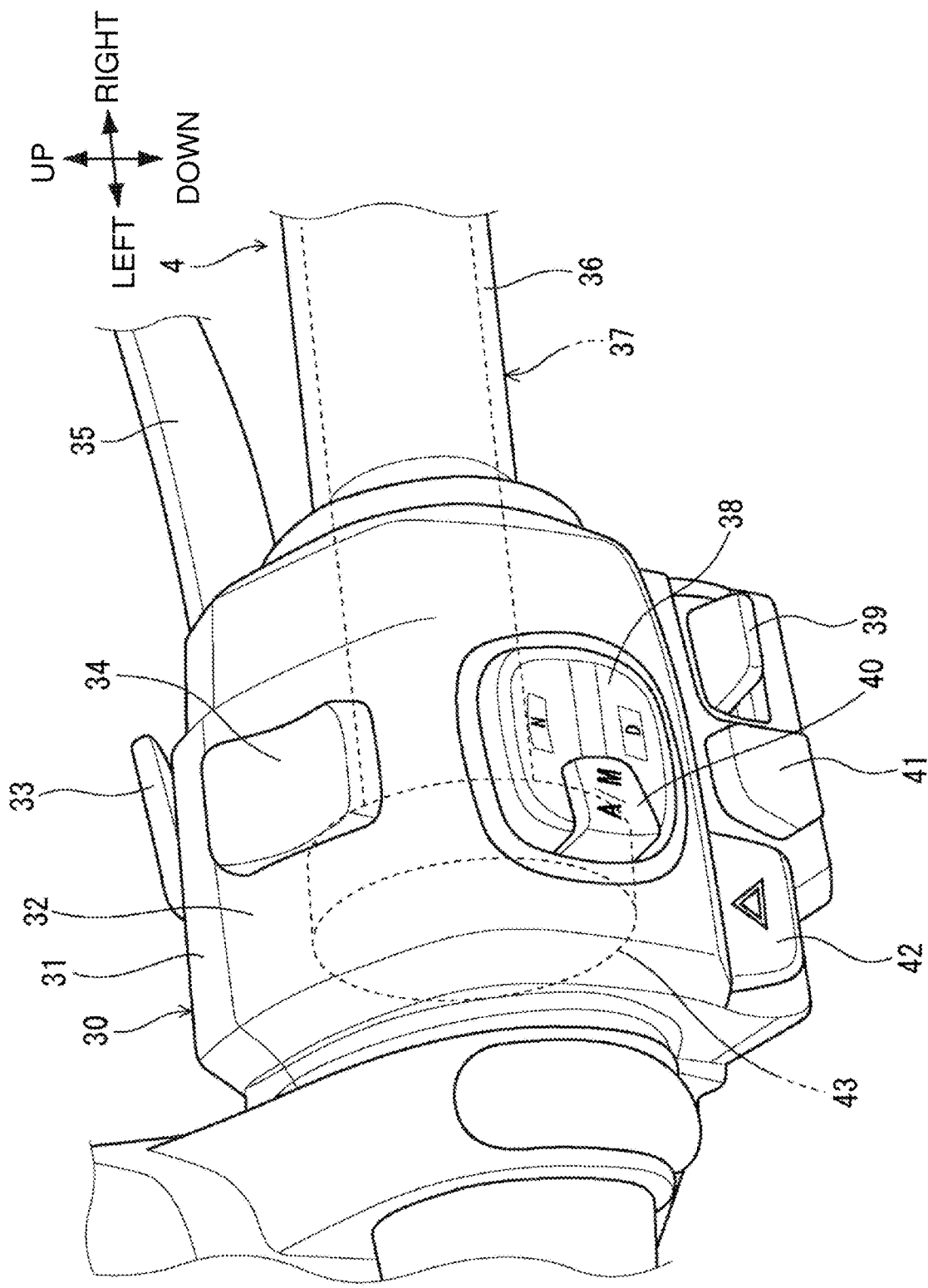
FIG. 2 is a perspective view showing the structure around a right steering handle.

FIG. 2 is a perspective view showing the structure around the right steering handle 4. On the right end of the pipe-like steering handle 4, a box-like switch box 30, a throttle grip 37 covered with a grip rubber 36, and a brake lever 35 are disposed. The left end of the throttle grip 37, which is pivotally supported so as to be rotatable relative to the steering handle 4, engages with a throttle position sensor (TPS) 43 configured to detect the position of the throttle grip 37.

The switch box 30 is formed of a front case 31 on the front side and a rear case 32 on the rear side. The rear case 32 is equipped with: a starter switch 34 which also functions as a stop switch for the engine; a neutral/drive selector switch 38 for switching between the neutral and the in-gear state (a drive mode) on the transmission; an automatic/manual selector switch 40 for switching between the automatic mode where any shifting operation is not necessary and the manual mode where the gear position is switched by the driver's operating shift switches; a hazard lamp switch 42; a cruise control activation switch 41 which enables cruise traveling at a predetermined vehicle speed; and a vehicle speed adjustment switch 39 for adjusting the predetermined vehicle speed under the cruise control. On the other hand, the front case 31 is provided with a traveling mode selector switch 33 for arbitrarily changing the output characteristic of the power unit and the attenuation characteristic of suspension. By being pressed down when the engine speed Ne is at a predetermined value or more and the vehicle speed V is a predetermined value or more, the cruise control activation switch 41 activates the cruise control of keeping the vehicle speed V at a constant value. By being pressed down under the cruise control, the cruise control activation switch 41 cancels the cruise control.

Figure 3:
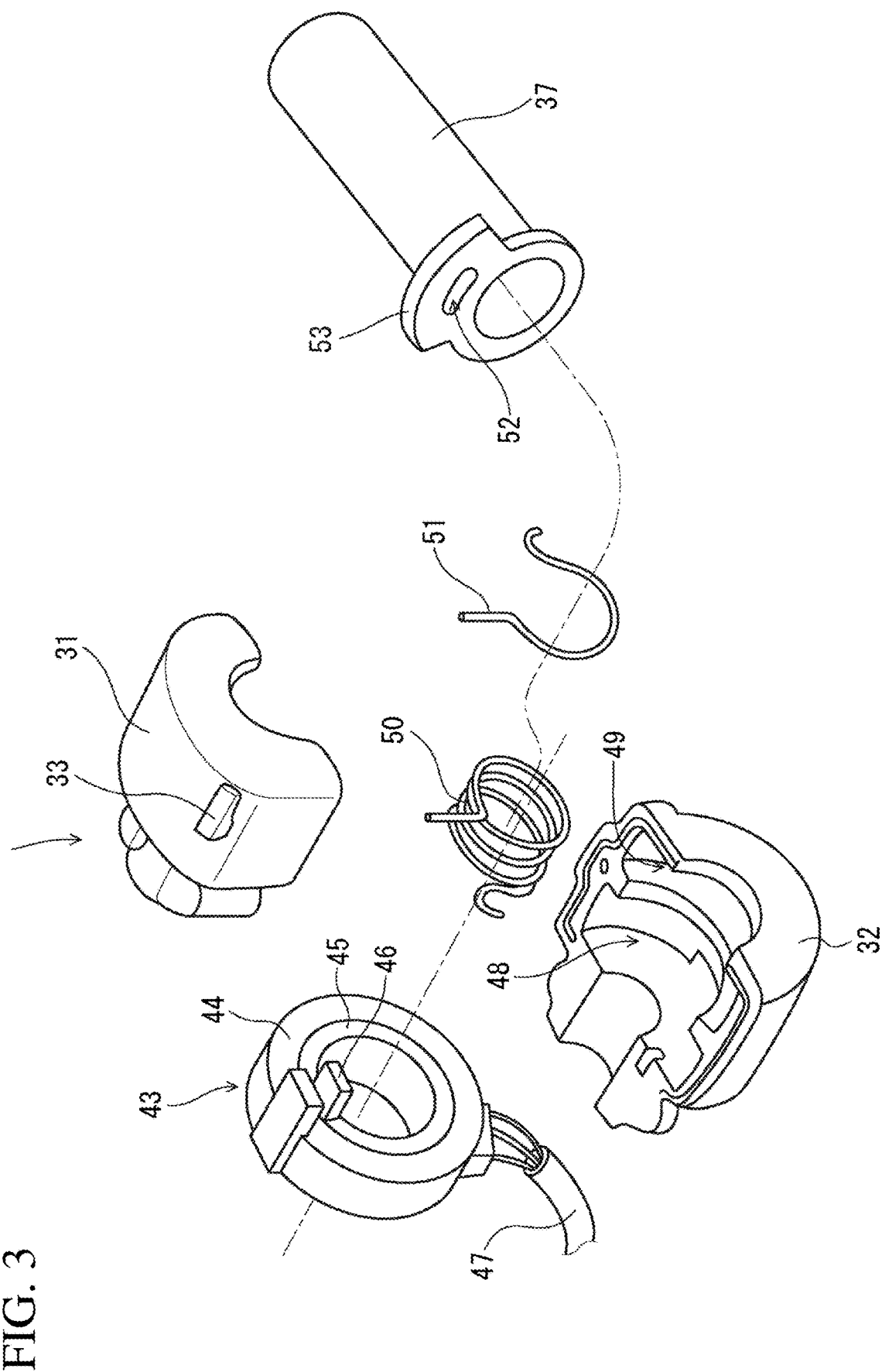
FIG. 3 is an exploded view of a switch box.

FIG. 3 is an exploded view of the switch box 30. The throttle position sensor 43 includes an outer annular element 44 supported by a first housing recess 48 of the rear case 32, and an inner annular element 45 supported rotatably relative to the outer annular element 44. The rotation angle of the inner annular element 45 on the outer annular element 44 is output as a throttle position TH via a harness 47.

The first housing recess 48 of the rear case 32 houses the throttle position sensor 43 and a great diameter part 53 of the throttle grip 37. Here, a projection 46 provided at the inner annular element 45 of the throttle position sensor 43 engages with the engagement hole 52 formed at the great diameter part 53 of the throttle grip 37.

The throttle grip 37 according to the present embodiment is rotatable not only in the forward direction for adjusting the output of the power unit P but also in the reverse direction with reference to the neutral position. The second housing recess 49 of the rear case 32 houses a first return spring 50 configured to give biasing force to the throttle grip 37 to return to the neutral position when the throttle grip 37 is rotated forward, and a second return spring 51 configured to give biasing force to the throttle grip 37 to return to the neutral position when the throttle grip 37 is reversely rotated. The rotation range of the throttle grip 37 may be set, for example, to 110 degrees in the forward direction and 5 degrees in the reverse direction.

The present invention is characterized in that, the driver's reversely rotating the throttle grip 37 with the vehicle being parked actuates the parking brake, which continuously prohibits the rotation of the rear wheel WR. Specifically, by being triggered by the throttle grip 37 being reversely rotated, a motor is driven to actuate the rear-wheel brake caliper 95. In more detail, the throttle grip 37 being reversely rotated functions as an activation trigger for the parking brake only when a predetermined condition is satisfied when the vehicle is being parked (when the vehicle speed V is zero). On the other hand, such reversely rotating the throttle grip 37 during travel of the motorcycle 1 functions as an operation of canceling the cruise control. Thus, two different functions are realized with the reverse rotation on the throttle grip 37 depending on the vehicle speed. This further improves convenience of the motorcycle 1.

In this manner, by virtue of the parking brake being actuated in response to a driver's reversely rotating the throttle grip 37, the driver can actuate the parking brake apparatus while gripping the steering handle 4. This improves stability and safety in the operation. Furthermore, the throttle grip 37 also serving as an operating element of the parking brake eliminates the necessity of providing an operating element dedicated to the parking brake. This contributes to reducing the number of components and manufacturing costs, and to improving the appearance of the vehicle.

Figure 4:
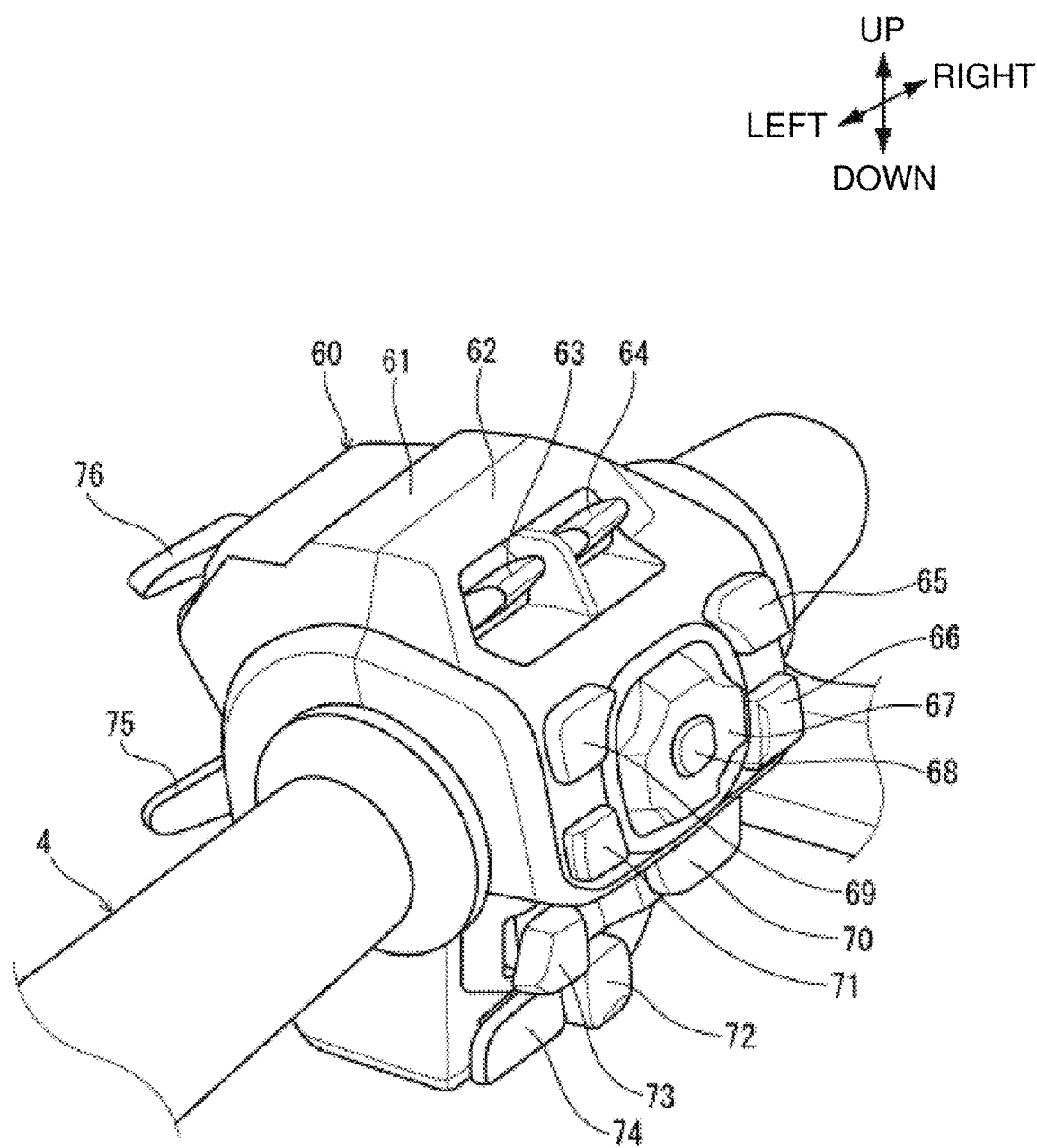
FIG. 4 is a perspective view showing the structure around a left steering handle.

FIG. 4 is a perspective view showing the structure around the left steering handle 4. At the steering handle 4, a switch box 60 formed of a front case 61 and a rear case 62 is provided. What are provided at the rear case 62 are: an audio volume switch 63; a height adjustment switch 64 for the windshield screen 6; a D-pad 67; an enter button 68; a home button 65, a return button 66, and a call button 69 for entering operations on a screen display on the meter apparatus 20; a horn switch 71, a flasher lamp switch 73, a creep speed travel mode switch 72, and a shift-down switch 74. On the other hand, at the front case 61, a blinker light switch 76 and a shift-up switch 75 are provided.

The shift-up switch 75 and the shift-down switch 74 function as gear-shift switches when the power unit P is set to the manual mode. Furthermore, when the creep speed mode is being selected with the creep speed travel mode switch 72, the shift-up switch 75 and the shift-down switch 74 function as creep speed travel switches which execute creep-speed forward travel or creep-speed backward travel just when they are being operated.

Figure 5:
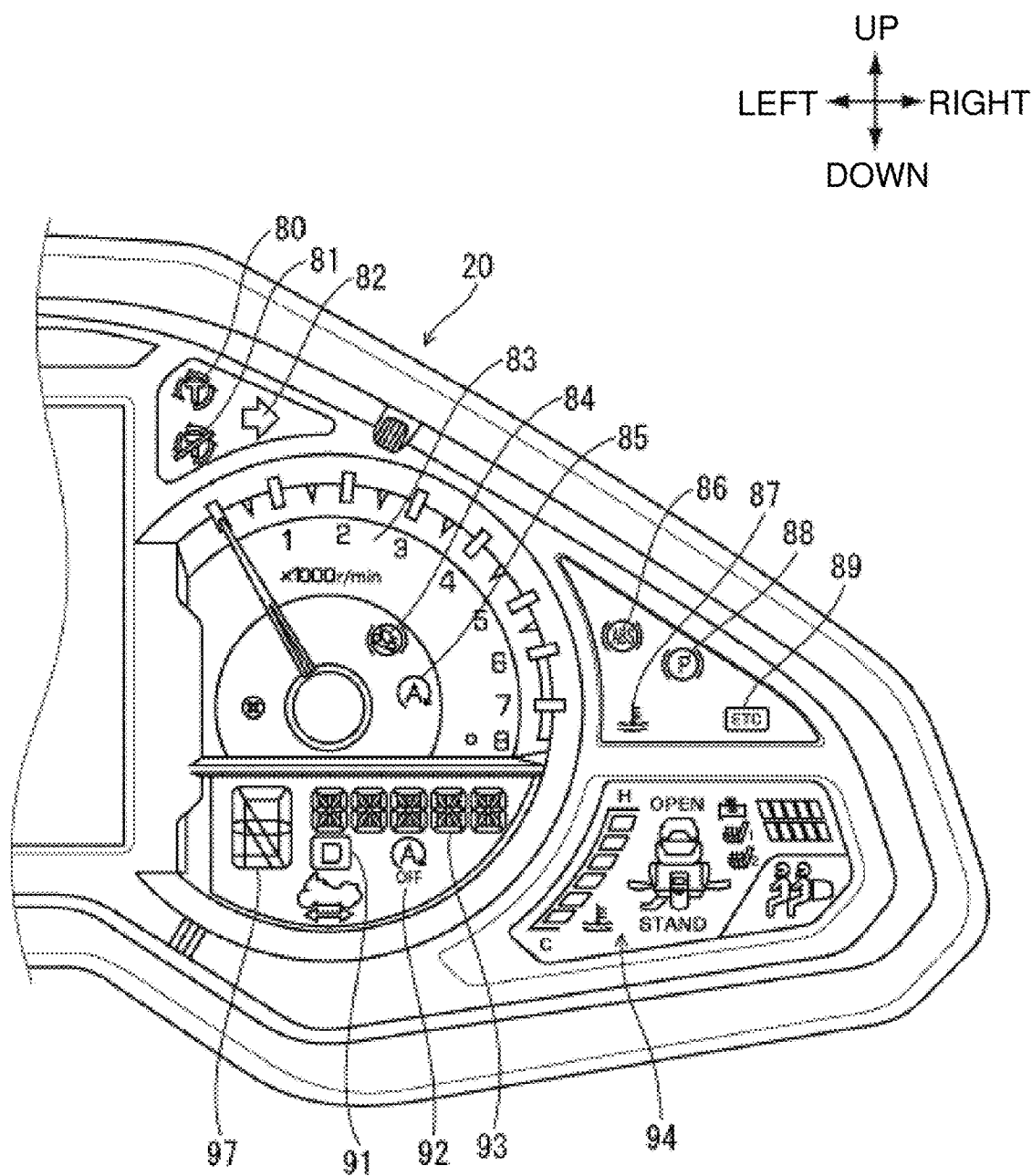
FIG. 5 is a front view of a meter apparatus.

FIG. 5 is a front view of the meter apparatus 20. In the drawing, only part of the right side of the meter apparatus 20 is shown. At the upper part of a needle-type engine tachometer 29, traction control in-operation lamps 80, 81 for indicating effectiveness and ineffectiveness of the traction control function, and a flasher lamp in-operation lamp 82 for indicating the operation state of the right flasher lamp are provided.

What are provided on the dial of the engine tachometer 83 are: an HSA in-operation lamp 84 notifying the activation of the HSA function which automatically actuates the brake in parking on a hill; and an idling-stop effective lamp 85 for indicating that the idling stop function is in the effective state. What are provided beneath them are: a gear-stage indicator lamp 97 for indicating the gear stage of the transmission; a traveling mode indicator lamp 93; a drive mode indicator lamp 91 for indicating that the transmission is in the drive mode which is the in-gear state; and an idling-stop ineffective lamp 92 for indicating that the idling stop function is in the ineffective state. On the lower right side of the engine tachometer 83, a multi-indicator 94 for indicating the engine water temperature and the like are disposed.

What are provided on the right side of the engine tachometer 83 are: an ABS in-operation lamp 86 for indicating that the ABS function is in the effective state; a cooling water temperature warning lamp 87; an ETC in-operation lamp 89 for indicating that the ETC apparatus is effective; and a parking brake in-operation lamp 88 as a display part for indicating the operation state of the parking brake.

The parking brake in-operation lamp 88 turns on in response to actuation of the parking brake, and maintains the turned-on state while the parking brake is in operation even if the power supply of the vehicle is turned off. Thus, by virtue of the throttle grip 37 also serving as an operating element of the parking brake, without any operating element for operating the parking brake such as lever, the operation state of the parking brake is visually recognized. Alternatively, after a lapse of a predetermined time since turn-off of the power supply of the vehicle, the parking brake in-operation lamp 88 may be turned off until the power supply is turned on again.

Figure 6:
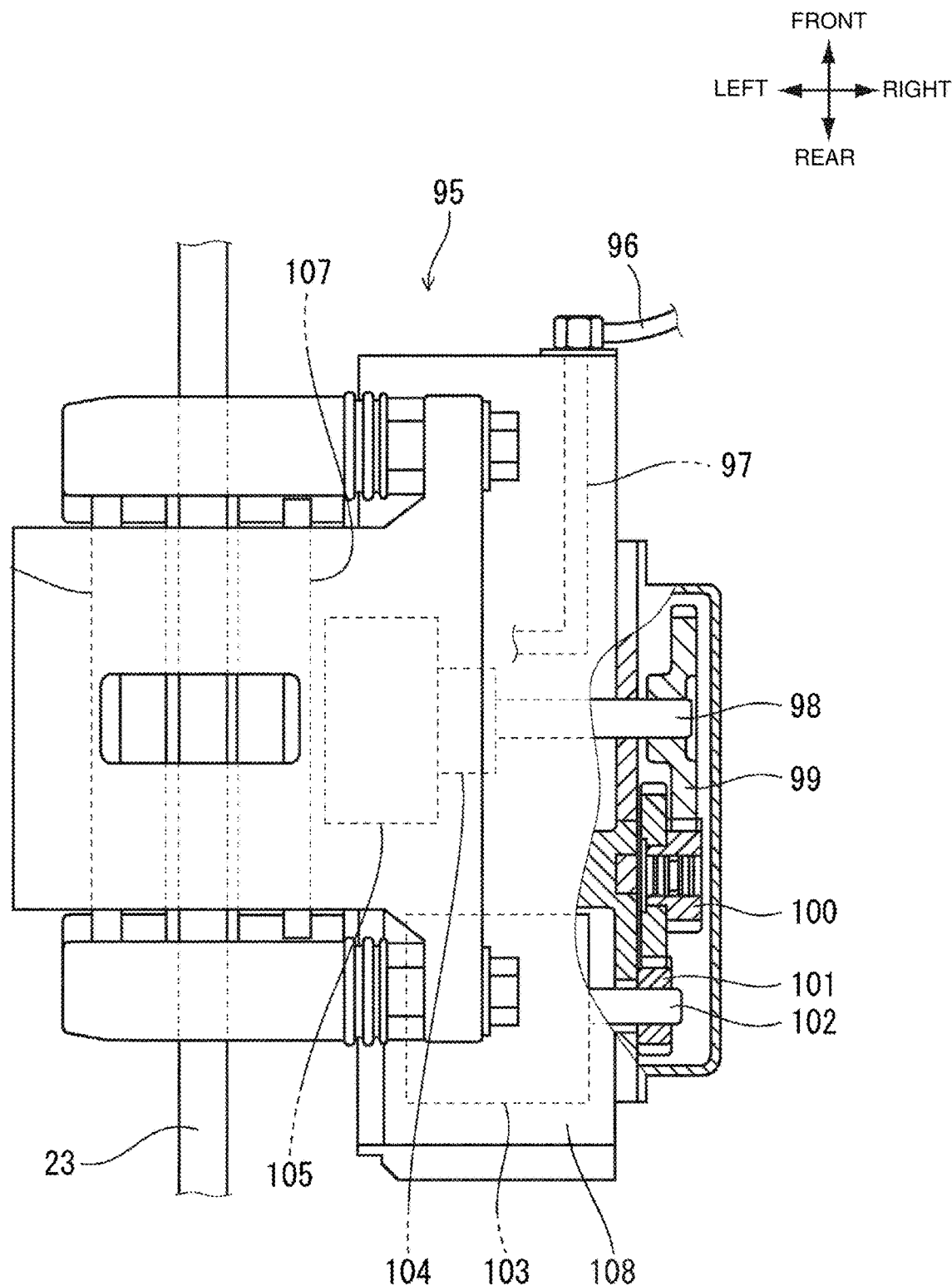
FIG. 6 is a plan view of a rear-wheel brake caliper.

FIG. 6 is a plan view of the rear-wheel brake caliper 95. The rear-wheel brake caliper 95 realizes, with a single body part 108, a function as the regular brake for applying braking force in response to an operation on the brake pedal during traveling of the vehicle, and a function as the parking brake which continuously applies predetermined braking force in response to the throttle grip 37 being reversely rotated while the vehicle is being parked.

According to an operation on the brake pedal as a brake operating element, the rear-wheel brake caliper 95 pushes out a piston 105 by means of hydraulic pressure received from the brake pipe 96 and presses the brake pad 107 against the rear-wheel brake disc 23. On the other hand, in actuating the parking brake, a motor 103 is driven in response to the throttle grip 37 being reversely rotated, to rotate an actuation shaft 98 fixed to a third gear 99 via a second gear 100 from a first gear 101 fixed to an output shaft 102, and pushes out the piston 105 by a pushing member 104 which has a screw mechanism. Note that, the rear-wheel brake caliper 95 may separately include a piston actuated by the motor 103, and a piston actuated by means of hydraulic pressure received from the brake pipe 96. By virtue of the motor 103 actuating the parking brake, for example, the present embodiment is capable of arbitrary restricting the actuation of the parking brake according to the state of the vehicle, which is not realized by the structure including the throttle grip 37 and the parking brake mechanically coupled to each other.

Figure 7:
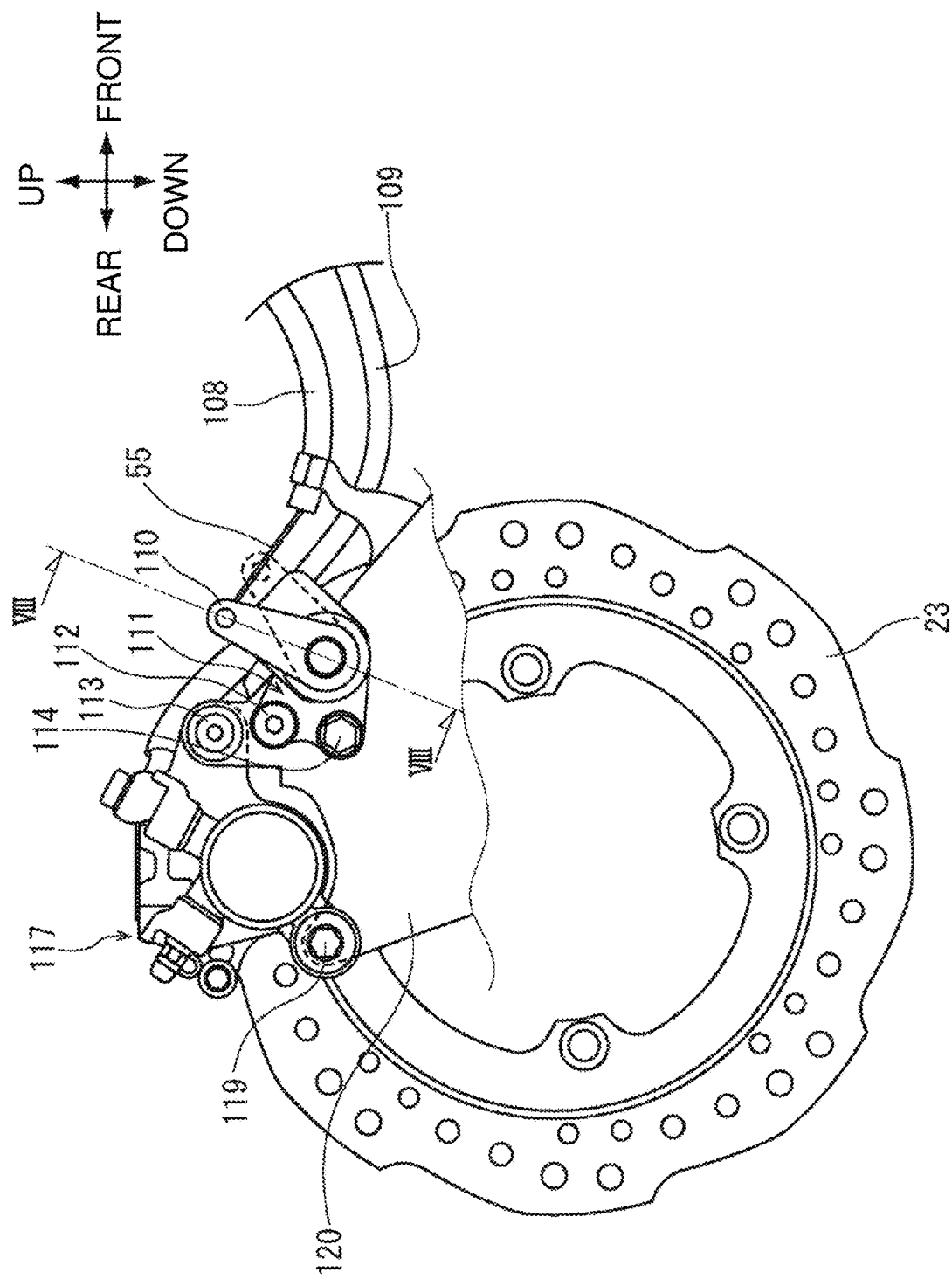
FIG. 7 is an illustration showing the structure around a parking brake caliper according to a second embodiment of the present invention.
Figure 8:
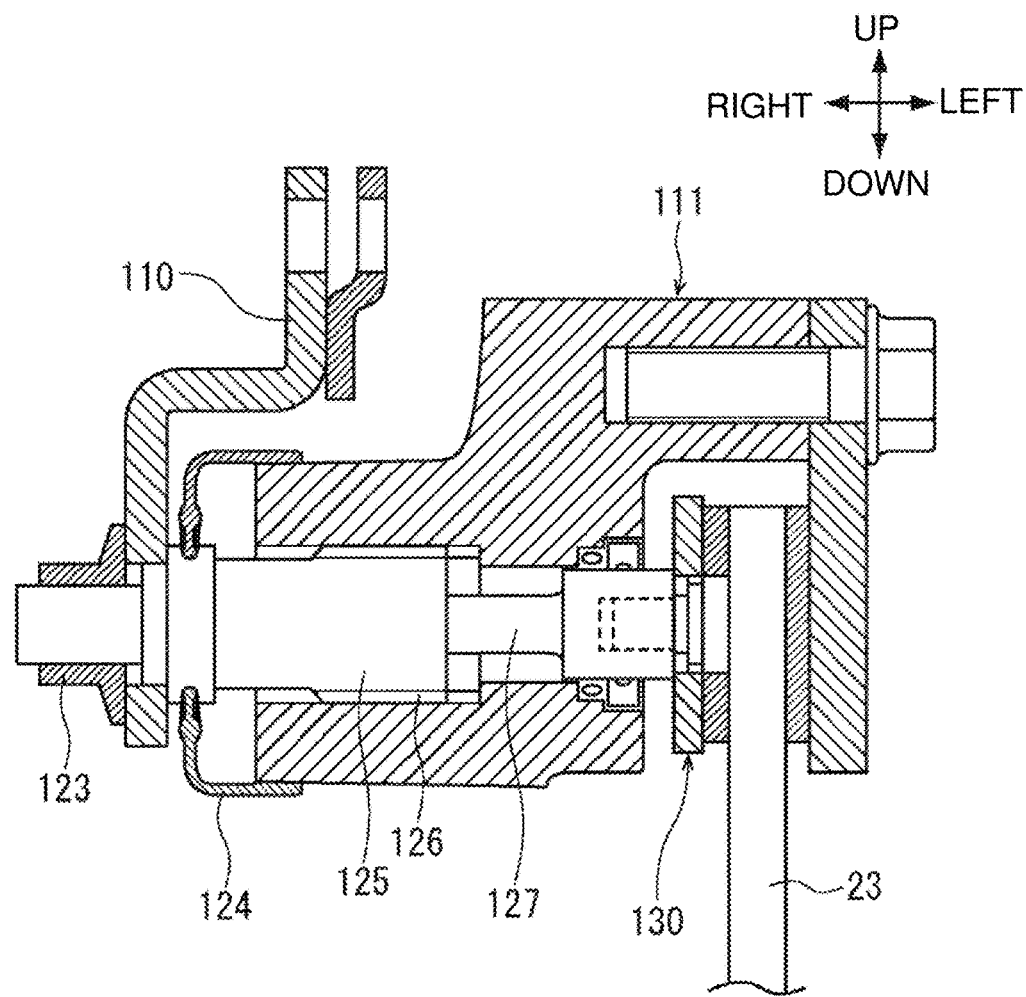
FIG. 8 is a cross-sectional view taken along line VIII-VIII in FIG. 7.

FIG. 7 is an illustration showing the structure around a parking brake caliper 111 according to a second embodiment of the present invention. FIG. 8 is a cross-sectional view taken along line VIII-VIII in FIG. 7. The present embodiment is different from the rear-wheel brake caliper 95 shown in FIG. 6 in that the parking brake caliper 111 is structured separately from the regular brake caliper 117 which is used during traveling. Furthermore, the present embodiment realizes downsizing the parking brake caliper 111 by disposing the motor 103 driving the parking brake caliper 111 on the vehicle body side.

The regular brake caliper 117 and the parking brake caliper 111 are fixed to a bracket 120 supported by the swingarm 13. The regular brake caliper 117 fixed to the bracket 120 with fastening members 113, 119 is actuated by means of hydraulic pressure supplied from a brake pipe 109. On the other hand, the parking brake caliper 111 fixed to the bracket 120 with fastening members 112, 114 is actuated by the motor 103 disposed on the vehicle body side pulling an inner wire 55 of a cable 108 thereby swinging a lever member 110 coupled to the inner wire 55.

With reference to FIG. 8, the lever member 110 is fixed with a nut 123 to an actuation shaft 125 which has a male screw part 126 screwing with a female screw part formed at the parking brake caliper 111. The actuation shaft 125 is provided with a boot 124 which protects the screw mechanism from moisture or dust. In this structure, when the lever member 110 swings as being pulled by the inner wire 55, the actuation shaft 125 pushes the piston 127 and the brake pad 130 is pressed against the rear-wheel brake disc 23.

Figure 9:
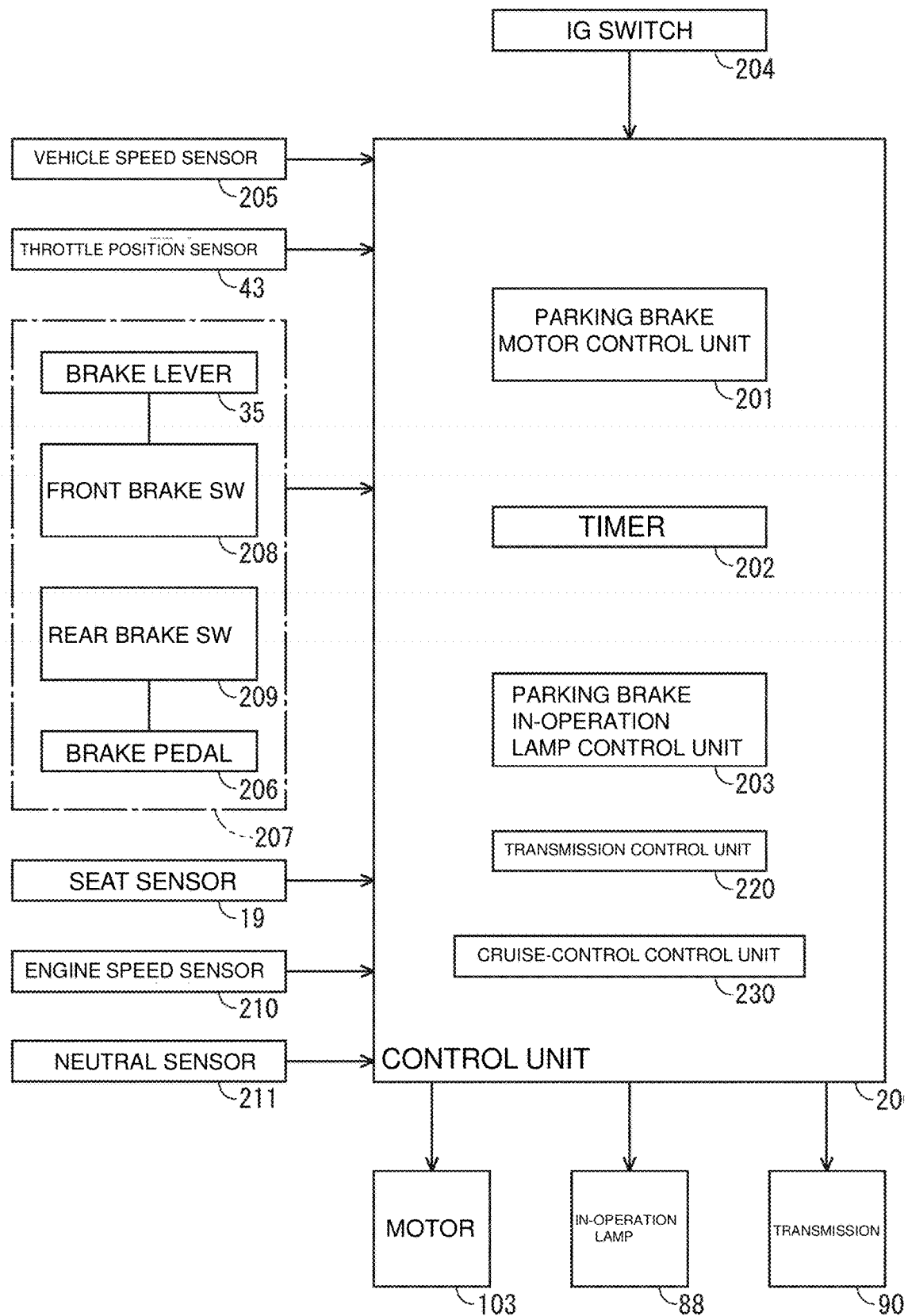
FIG. 9 is a block diagram showing the structure around a control unit included in the parking brake apparatus.

FIG. 9 is a block diagram showing the structure around a control unit 200 included in the parking brake apparatus of the present invention. The control unit 200 includes: a parking brake motor control unit 201 configured to control the motor 103 which actuates the parking brake; a timer 202 configured to measure a predetermined time; a parking brake in-operation lamp control unit 203 configured to drive the parking brake in-operation lamp 88 disposed in the meter apparatus 20; a transmission control unit 220 configured to control a transmission 90 using a dual clutch; and a cruise-control control unit 230 configured to start and end cruise-control control.

The control unit 200 receives information from the vehicle speed sensor 205, the throttle position sensor 43, a brake switch 207, the seat sensor 19, the engine speed sensor 210, and the neutral sensor 211. The brake SW (switch) 207 consists of a front brake SW (switch) 208 configured to detect an operation of the brake lever 35, and a rear brake SW (switch) 209 configured to detect an operation of the brake pedal 206. While a detailed description will be given later, the control unit 200 is configured to continuously operate part of its function despite an ignition switch (IG switch) 204 being turned off.

Figure 10:
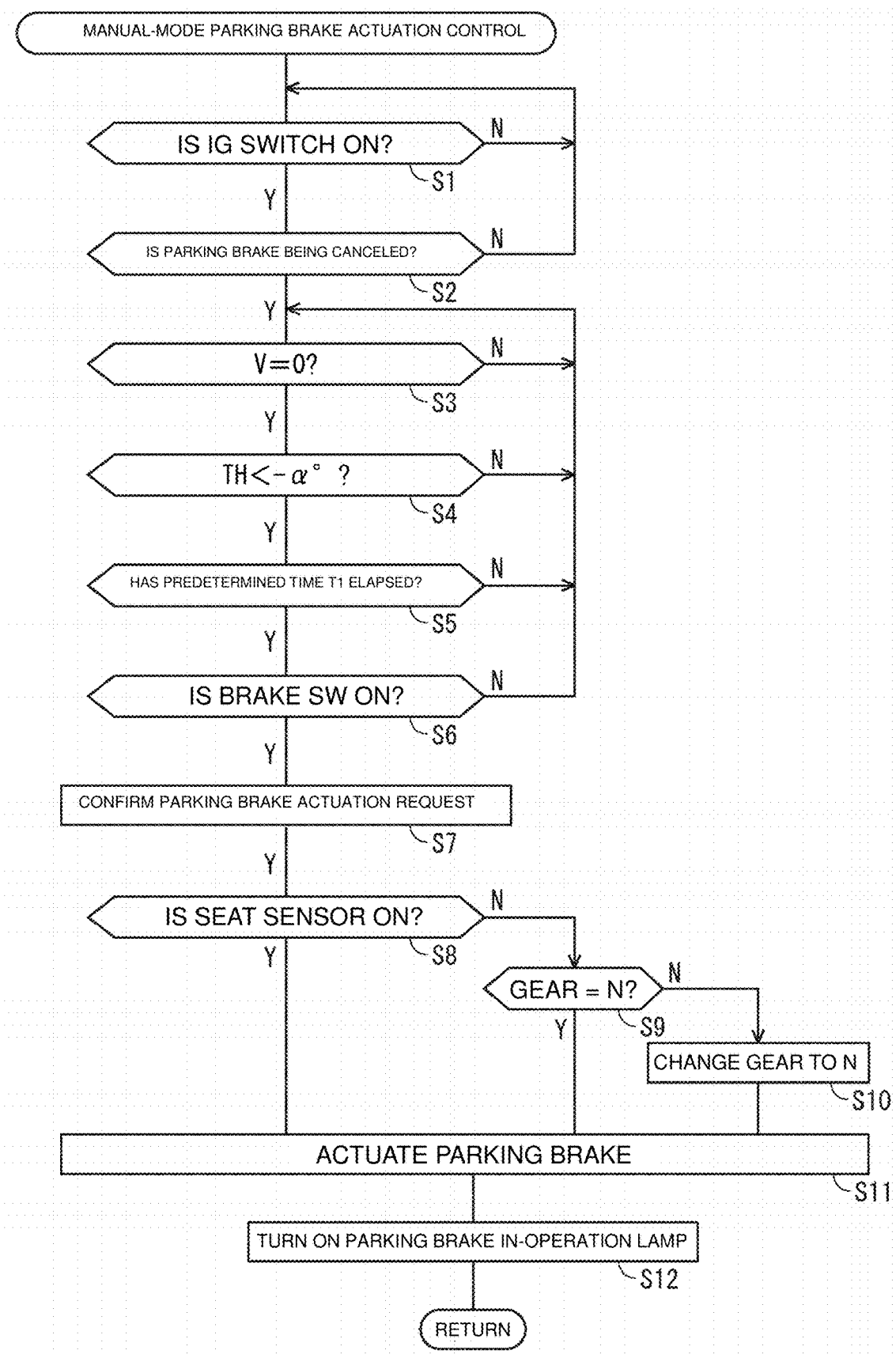
FIG. 10 is a flowchart of the procedure of manual-mode parking brake actuation control.

FIG. 10 is a flowchart of the procedure of manual-mode parking brake actuation control. The operation mode of the parking brake can be arbitrarily switched between the manual mode in which the parking brake is actuated by being triggered by the throttle grip 37 being reversely rotated, and the automatic mode in which the parking brake is automatically actuated by a predetermined condition being satisfied. The flowchart shows the operation procedure of the control unit 200 in actuating the parking brake in the manual mode.

In Step S1, whether or not the ignition switch 204 is on is determined. When determined affirmative, control proceeds to Step S2. In Step S2, whether or not the parking brake is being canceled (the non-operation state) is determined. When determined affirmative, control proceeds to Step S3. When determined negative in Steps S1 and S2, control returns to Step S1. Note that, the determination in Step S2 is carried out on the basis of signals from the sensor measuring the piston position of the parking brake caliper, and the control information of the motor.

In Step S3, whether or not the vehicle speed V is zero, that is, whether or not the motorcycle 1 is in the stopped state, is determined. When determined affirmative, control proceeds to Step S4. In Step S4, whether or not a throttle position TH detected by the throttle position sensor 43 is less than minus $\alpha°$ (for example, −4°) is determined. Thus, for example in the structure where the throttle grip 37 hits the stopper in the reverse direction by minus 5°, it is determined that a reverse operation is intentionally performed in order to actuate the parking brake. When determined affirmative in Step S4, control proceeds to Step S5.

In Step S5, using the value measured by the timer 202, it is determined whether or not a predetermined time T1 (for example, 2 seconds) has elapsed since the throttle position TH had attained less than minus $\alpha°$. When determined affirmative in Step S5, control proceeds to Step S6, where it is determined whether or not the brake switch 207 is in the on state. In Step S6, it is determined affirmative when the front brake switch 208 or the rear brake switch 209 is in the on state. When determined negative in Steps S3, S4, S5, S6, control returns to Step S3.

When determined affirmative in Step S6, control proceeds to Step S7 where the request for actuating the parking brake is confirmed. In Step S8, whether or not the seat sensor 19 is on, that is, whether or not the driver is seated on the seat 18, is determined. When determined affirmative, the motor 103 is driven in Step S11 to actuate the parking brake.

On the other hand, whet it is determined negative in Step S8, control proceeds to Step S9, where whether or not the gear of the transmission 90 is in the neutral state is determined by the neutral sensor 211. When determined affirmative in Step S9, control proceeds to Step S11 to actuate the parking brake. When determined negative in Step S9, control proceeds to Step S10, where the transmission control unit 220 switches the transmission 90 to the neutral state. Then, control proceeds to Step S11.

In Step S12, according to the actuation of the parking brake calipers 95, 111, the parking brake in-operation lamp control unit 203 turns on the parking brake in-operation lamp 88. This ends the control sequence.

According to the above-described control procedure, when the actuation condition that at least the vehicle speed V be zero and the throttle grip 37 be reversely rotated is satisfied, the control unit 200 actuates the parking brake calipers 95, 111. Thus, it is set to avoid actuation of the parking brake in response to a reverse rotation of the throttle grip 37 during traveling.

As a further actuation condition for the parking brake, when an operation of the brake lever 35 or the brake pedal 206 is detected, the control unit 200 actuates the parking brake calipers 95, 111. Accordingly, when the throttle grip 37 is reversely rotated with the vehicle speed V being zero, the parking brake is not actuated unless the regular brake is operated. Thus, actuation control which clearly reflects the operation intention of the driver is realized.

As a further actuation condition for the parking brake, when the seat sensor 19 detects that the driver is seated, the control unit 200 actuates the parking brake calipers 95, 111. Accordingly, the actuation control is exerted when a suitable state for actuating the parking brake is determined employing the information of the seat sensor 19 in addition to the operation state of the vehicle speed V and the regular brake. In detail, when the driver is seated, the parking brake is actuated despite the in-gear state because the driver is ready for re-starting and hence the driver's operation intension is clear. On the other hand, when the driver is not seated, for example, the driver who is gripping the steering handles 4 to wheel the vehicle may possibly unintentionally reversely rotate the throttle grip 37. Hence, the parking brake is prevented from actuating in this case.

When the vehicle speed V is zero; the brake lever 35 or the brake pedal 206 is operated; the throttle grip 37 is reversely rotated; and the seat sensor 19 does not detect that the driver is seated, the control unit 200 actuates the parking brake calipers 95, 111 if the transmission 90 is in the neutral N. Accordingly, when the driver is not seated, the parking brake can be actuated under the added condition that the gear stage be neutral. On the other hand, when the gear stage is not in the neutral and in the in-gear state, the gear stage is changed to the neutral and then the parking brake calipers 95, 111 are actuated. This prevents actuation of the parking brake in the in-gear state when the driver gets off the vehicle and actuates the parking brake.

Figure 11:
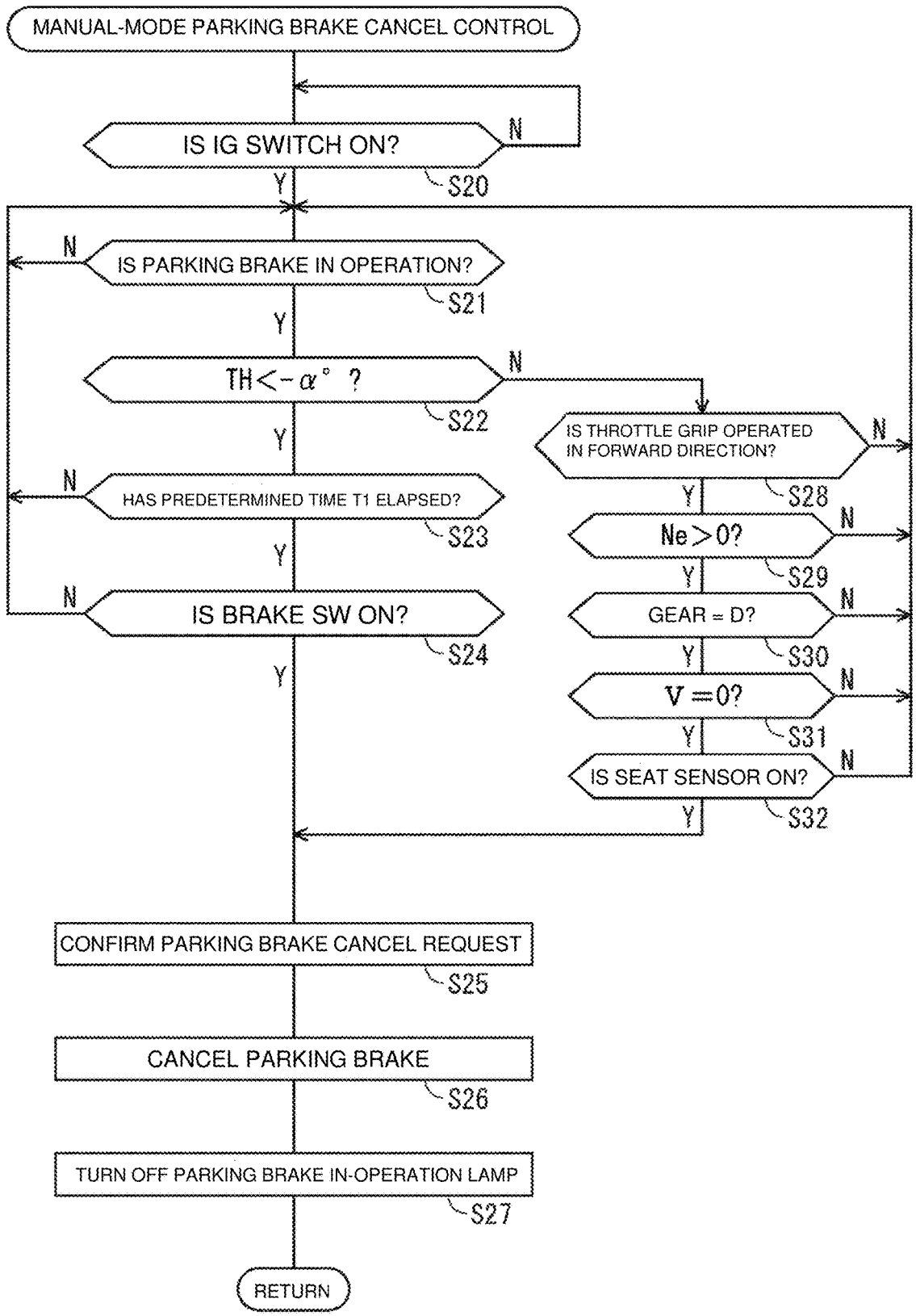
FIG. 11 is a flowchart of the procedure of manual-mode parking brake cancel control.

FIG. 11 is a flowchart of the procedure of the manual-mode parking brake cancel control. The flowchart is the operation procedure of the control unit 200 in canceling the parking brake in the manual mode. In Step S20, whether or not the ignition switch 204 is on is determined. When determined affirmative, control proceeds to Step S21. When determined negative in Step S20, control returns to the determination in Step S20.

In Step S21, whether or not the parking brake is in operation is determined. When determined affirmative, control proceeds to Step S22. In Step S22, whether the throttle position TH is less than minus $\alpha°$ is determined. When determined affirmative, control proceeds to Step S23. In Step S23, whether or not a predetermined time T1 (for example, 2 seconds) has elapsed is determined. When determined affirmative, control proceeds to Step S24. In Step S24, whether or not the brake switch 207 is in the on state is determined. When determined affirmative, control proceeds to Step S25, where the cancel request of the parking brake is confirmed. Note that, when determined negative in Steps S21, S23, S24, control returns to Step S21.

On the other hand, when determined negative in Step S22, control proceeds to Step S28, where whether or not the throttle grip 37 is operated in the forward direction is determined. When determined affirmative in Step S28, that is, when it is determined that the driver has operated to start, control proceeds to Step S29. In Step S29, whether or not the engine speed Ne exceeds zero, that is, whether the engine E is in operation, is determined. When determined affirmative, control proceeds to Step S30. In Step S30, whether or not the gear of the transmission 90 is in the drive mode (the in-gear state) is determined. When determined affirmative, control proceeds to Step S31. In Step S31, whether or not the vehicle speed V is zero is determined. When determined affirmative, control proceeds to Step S32. In Step S32, whether or not the seat sensor 19 is on is determined, and control proceeds to Step S25. Note that, when determined negative in Steps S28, S29, S30, S31, S32, control returns to Step S21.

In Step S25, the cancel request of the parking brake is confirmed. Control then proceeds to Step S26, where the motor 103 is driven to cancel the parking brake. Accordingly, in Step S27, the parking brake in-operation lamp 88 is turned off, and the control sequence ends.

According to the above-described control procedure, when the manual mode is being selected, the parking brake is canceled by a reverse rotation on the throttle grip 37. When it is desired to actuate the parking brake for temporal stop or the like, if the gear of the transmission 90 is in the drive mode and the driver is seated on the seat 18, the parking brake is canceled by a starting operation, that is, a forward rotation on the throttle grip 37. Thus, the convenience of the motorcycle 1 improves.

Figure 12:
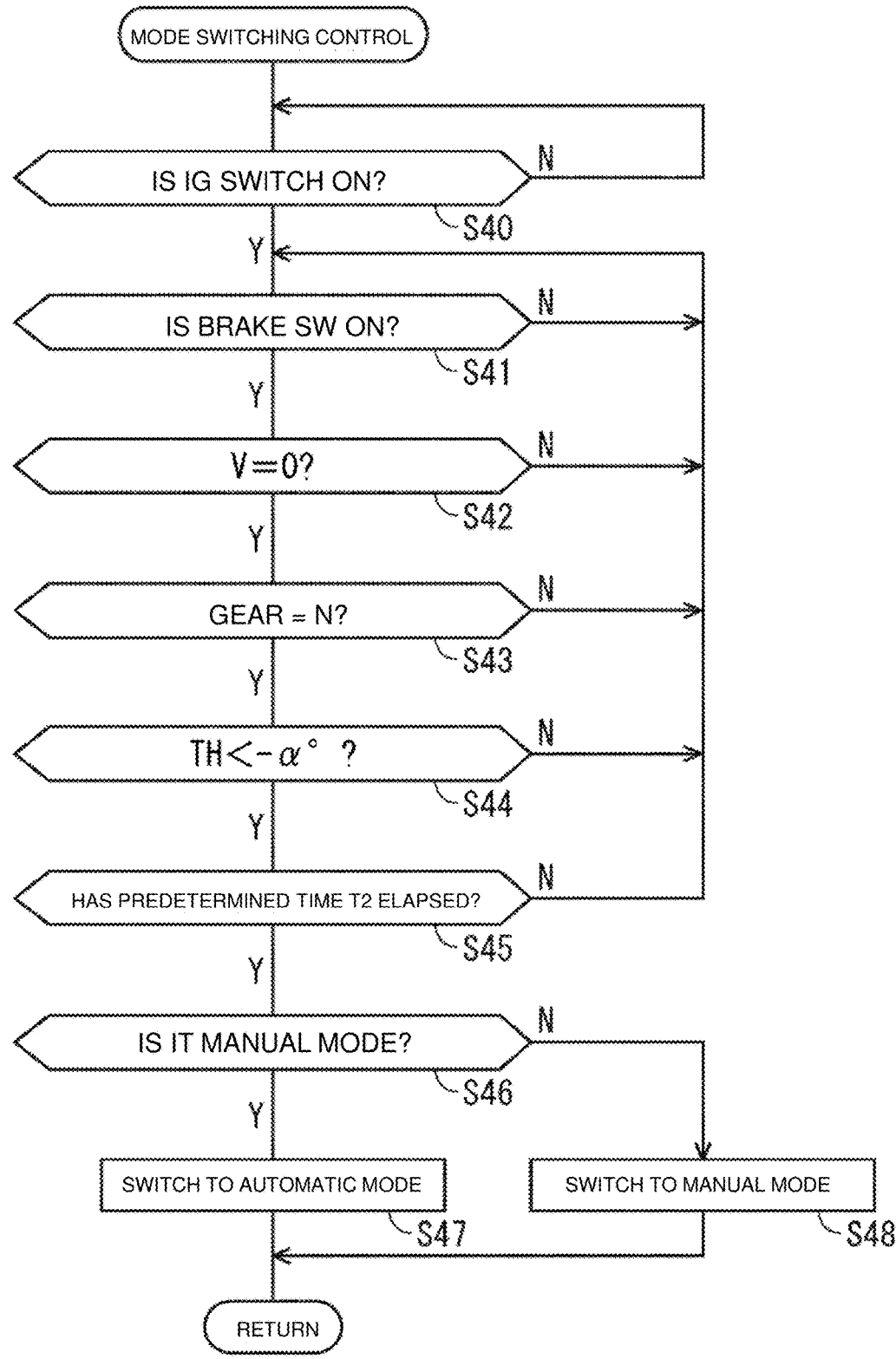
FIG. 12 is a flowchart of the procedure of mode switching control.

FIG. 12 is a flowchart of the procedure of mode switching control. As described above, in the present embodiment, a driver's operation switches the manual mode in which the parking brake is actuated according to the operation of the throttle grip 37 and the automatic mode in which the parking brake is automatically actuated in response to a predetermined condition without any operation on the throttle grip 37.

In Step S40, whether or not the ignition switch 204 is turned on is determined. When determined affirmative, control proceeds to Step S41. When determined negative in Step S40, control returns to Step S40.

In Step S41, whether or not the brake switch 207 is turned on is determined. When determined affirmative, control proceeds to Step S42. In Step S42, whether or not the vehicle speed V is zero is determined. When determined affirmative, control proceeds to Step S43. In Step S43, whether or not the gear of the transmission 90 is in the neutral state is determined. When determined affirmative, control proceeds to Step S44.

In Step S44, whether or not the throttle position TH is less than minus $\alpha°$ is determined. When determined affirmative, control proceeds to Step S45. Then, in Step S45, whether or not a predetermined time T2 (for example, 4 seconds) has elapsed since the throttle position TH had become less than minus $\alpha°$ is determined. When determined affirmative, control proceeds to Step S46. In Step S46, whether or not the operation mode of the parking brake is the manual mode is determined. When determined affirmative, in Step S47, the mode is switched from the manual mode to the automatic mode. On the other hand, when determined negative in Step S47, that is, when the automatic mode is being selected, control proceeds to Step S48 where the automatic mode is switched to the manual mode and the control sequence ends.

According to the above-described control mode, a reverse operation on the throttle grip in the parking state switches the operation mode of the parking brake. Furthermore, when other condition is satisfied, simultaneously with the switching of the operation mode, the operation/non-operation of the parking brake is also switched. The setting of the operation mode is maintained after the ignition switch 204 is turned on or off unless the driver changes the operation mode. Thus, the turning on or off of the ignition switch 204 will not change the operation mode, preventing from the driver from feeling awkward in operating the parking brake. Note that, the parking brake in-operation lamp 88 is turned off when the manual mode is being selected and the parking brake is being canceled, and blinks slowly when the automatic mode is being selected and the parking brake is being canceled.

Figure 13:
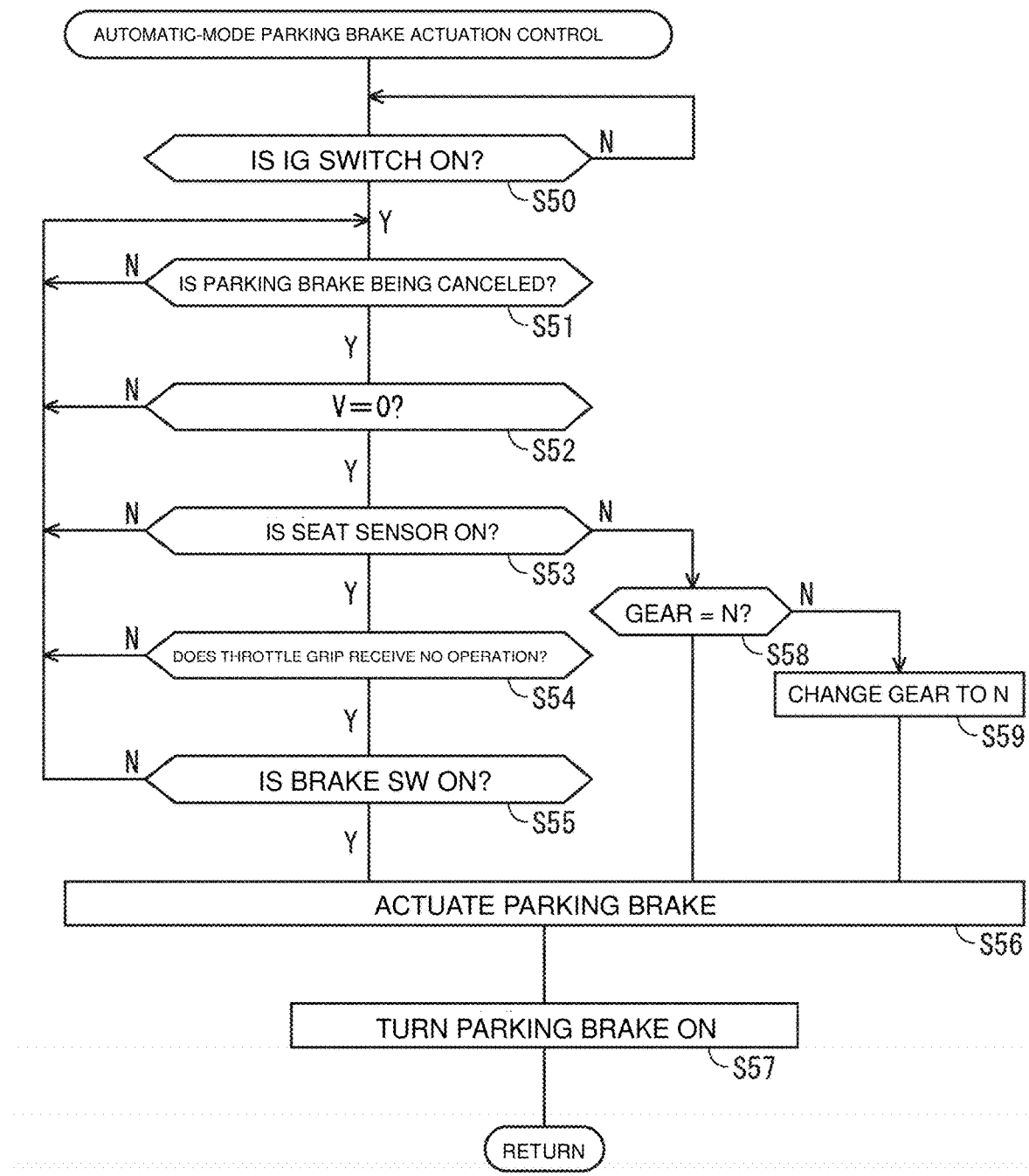
FIG. 13 is a flowchart of the procedure of automatic-mode parking brake actuation control.

FIG. 13 is a flowchart of the procedure of automatic-mode parking brake actuation control. When the automatic mode is being selected, the parking brake is automatically actuated in response to a predetermined condition being satisfied, without the necessity of the driver's operating the throttle grip 37.

In Step S50, whether or not the ignition switch 204 is on is determined. When determined affirmative, control proceeds to Step S51. When determined negative in Step S50, control returns to Step S50. In Step SM, whether or not the parking brake is being canceled is determined. When determined affirmative, control proceeds to Step S52.

In Step S52, whether or not the vehicle speed V is zero is determined. When determined affirmative, control proceeds to Step S53. In Step S53, whether or not the seat sensor 19 is on is determined. When determined affirmative, control proceeds to Step S54. In Step S54, whether or not the throttle grip 37 receives no operation is determined. When determined affirmative, control proceeds to Step S55. In Step S55, whether or not the brake switch 207 is the on state is determined. When determined affirmative, control proceeds to Step S56, where the parking brake is actuated. When determined negative in Steps S51, S52, S53, S54, S55, control returns to Step S51.

On the other hand, when determined negative in Step S53, control proceeds to Step S58, where whether or not the gear of the transmission 90 is in the neutral state is determined. When determined affirmative, control proceeds to Step S56, where the parking brake is actuated.

When determined negative in Step S58, that is, when the transmission 90 is in the in-gear state, the transmission 90 is switched to the neutral state in Step S59. Then, control proceeds to Step S56. In Step S56, the parking brake is actuated. Accordingly, in Step S57, the parking brake in-operation lamp 88 is turned on, and the control sequence ends.

According to the above-described control mode, when the automatic mode is being selected, the driver seated on the seat 18 of the parked vehicle operating the brake lever 35 or the brake pedal 206 actuates the parking brake. Thus, the highly convenient parking brake apparatus is provided. On the other hand, as shown in Steps S28 to S32 in FIG. 11, the driver operating a throttle operation for starting when the parking brake is in operation automatically cancels the parking brake. That is, this eliminates the necessity of the driver's intentionally performing an operation for canceling the parking brake. This improves stability and safety in parking.

When the driver parks and gets off the vehicle when the automatic mode is being selected, whether the transmission 90 is in the neutral state is determined before the parking brake is actuated. This avoids actuation of the parking brake in the in-gear state when the driver gets off the vehicle, and hence improves safety.

In the present embodiment, the operation mode of the parking brake in-operation lamp 88 is different between the manual mode and the automatic mode, so that the single parking brake in-operation lamp 88 is capable of indicating the operating/canceled state of the parking brake caliper and the select state of the manual mode/automatic mode. Specifically, when the manual mode is being selected, the parking brake in-operation lamp 88 is turned on according to the actuation of the parking brake; and the parking brake in-operation lamp 88 is turned off according to the cancellation of the parking brake. On the other hand, when the automatic mode is being selected, the parking brake in-operation lamp 88 transits from the slow blinking state to the light up state according to the parking brake being actuated; and the parking brake in-operation lamp 88 transits from the light up state to the slow blinking state when the parking brake is canceled. Thus, the driver can recognize that the operation mode is in the automatic mode when the parking brake is being actuated and canceled.

Note that, in switching from the manual mode to the automatic mode, the parking brake in-operation lamp 88 is slowly blinked; in switching from the automatic mode to the manual mode, the parking brake in-operation lamp 88 is turned off. Thus, the parking brake in-operation lamp 88 allows the driver to recognize also the operation mode switching execution status.

When the parking brake is in operation, the control unit 200 maintains the turned-on state of the parking brake in-operation lamp 88 even if the ignition switch 204 is turned off. Thus, in the structure not including an operating element dedicated to actuating the parking brake, the operation state of the parking brake is recognized despite the ignition switch 204 being turned off.

Figure 14:
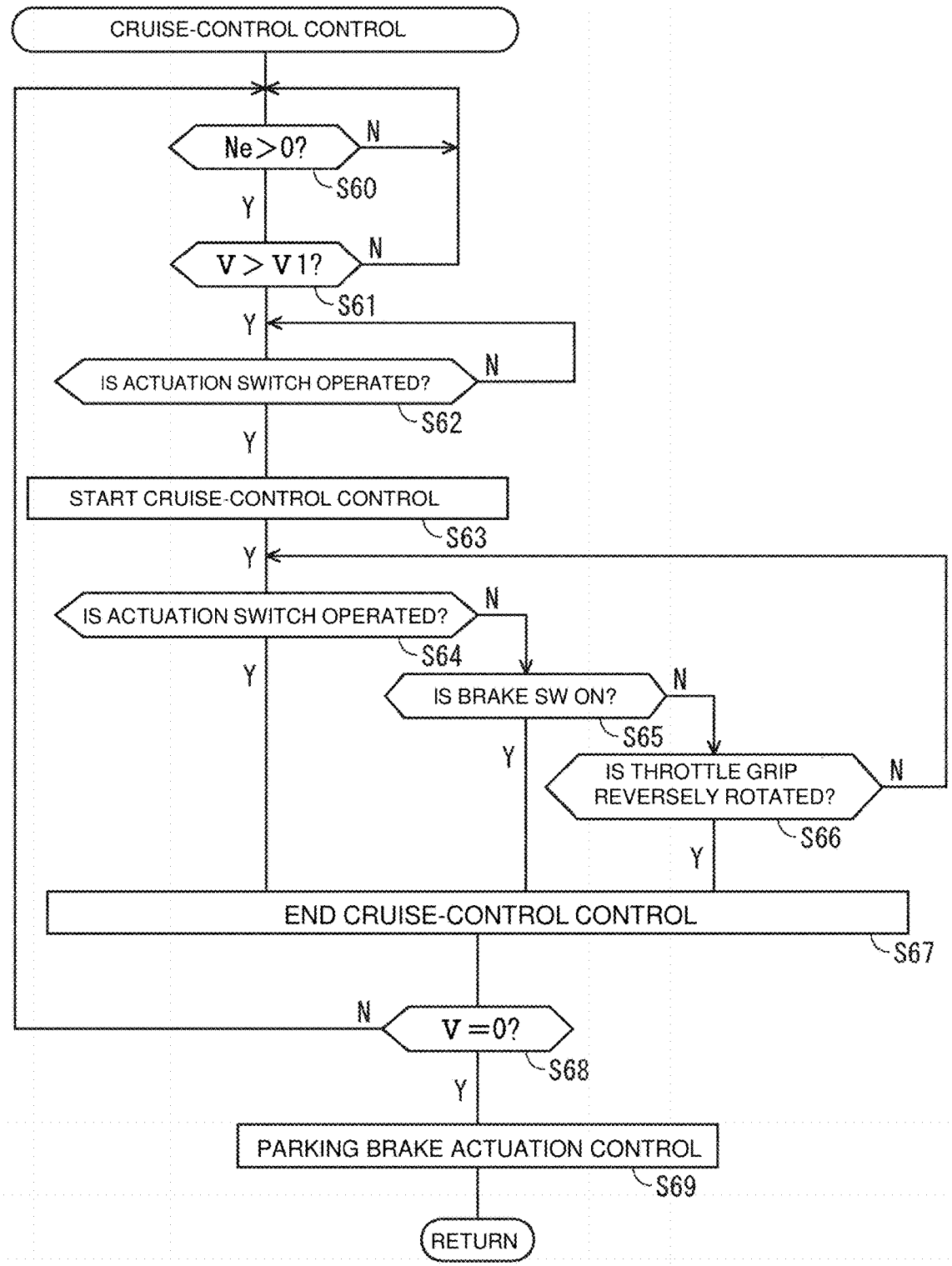
FIG. 14 is a flowchart of the procedure of cruise-control control.

FIG. 14 is a flowchart of the procedure of cruise-control control. As described above, a reverse rotation operation on the throttle grip 37 functions as an activation trigger for the parking brake only when a predetermined condition is satisfied during parking (where the vehicle speed V is zero). On the other hand, such a reverse rotation operation functions as a cruise control canceling operation during traveling of the motorcycle 1. Starting and ending the cruise-control control are executed by the cruise-control control unit 230 of the control unit 200.

In Step S60, whether or not the engine speed Ne exceeds zero, that is, whether or not the engine E is in operation, is determined. When determined affirmative, control proceeds to Step S61. In Step S61, it is determined whether or not the vehicle speed V exceeds a predetermined value V1 (for example, 30 km/h) at which the cruise-control control can be carried out. When determined affirmative, control proceeds to Step S62. In Step S62, it is determined whether or not a pressing operation is performed on the cruise control activation switch 41 (see FIG. 2). When determined affirmative, control proceeds to Step S63, where the cruise-control control starts. Note that, when determined negative in Step S62, control returns to Step S62.

In the present embodiment, executing one of the following three operations ends the cruise-control control started in Step S63, in other words, cancels the cruise control function.

In Step S64, whether or not the cruise control activation switch 41 is pressed is determined. When determined affirmative, control proceeds to Step S67, where the cruise-control control ends. When determined negative in Step S64, control proceeds to Step S65, where whether or not the brake switch 207 is in the on state is determined. When determined affirmative in Step S65, that is, when the brake operating element is operated during cruise control also, control proceeds to Step S67 where the cruise-control control ends. When determined negative in Step S65, control proceeds to Step S66, where whether or not the throttle grip 37 is reversely rotated is determined. When determined affirmative, control proceeds to Step S67, where the cruise-control control ends. On the other hand, when determined negative in Step S66, control returns to Step S64.

The determination in Step S66 is different from that in Step S4 in FIG. 10 where it is determined whether or not the throttle position TH detected by the throttle position sensor 43 is less than minus α° (for example, −4°). This is intended to immediately end the cruise-control control in response to any slight reverse rotation performed on the throttle grip 37 during cruise traveling. Thus, while similarly employing a reverse rotation on the throttle grip 37 as a parameter, the trigger for actuating/releasing the parking brake and the trigger for ending the cruise-control control are separately set. This enables control that fits the driver's sense. Note that, the determination in Step S66 may be made similarly to that in Step S4 in FIG. 10.

Then, in Step S68, whether or not the vehicle speed V is zero, that is, whether or not the motorcycle 1 is parking, is determined. When determined affirmative in Step S68, control proceeds to Step S69, and transits to the manual-mode parking brake actuation control in FIG. 10 or the automatic-mode parking brake actuation control in FIG. 13, according to the setting of the operation mode. Note that, when determined negative in Step S68, control returns to Step S60.

According to the control modes described above, when the vehicle speed V exceeds zero, the cruise control function is canceled by a reverse rotation operation on the throttle grip 37; when the vehicle speed V is zero, the parking brake is actuated by a reverse rotation operation on the throttle grip 37. Thus, a reverse rotation on the throttle grip 37 exhibits two different functions.

Note that, the mode of the motorcycle, the shape or structure of the throttle grip and the handle switches, the shape or structure of the parking brake calipers, the actuating/canceling condition for the parking brake, the switching condition for the operation mode of the parking brake, and the shape or structure of the parking brake in-operation lamp are not limited to the embodiment, and various changes can be made. For example, the power unit as the drive power source for the vehicle may be the hybrid type which employs both an engine and a motor. The transmission may be a normal transmission including a manual clutch, and the brake system may be the combined braking system. The parking brake apparatus of the present invention is not limited to a motorcycle, and is applicable to a saddled three-wheel vehicle, a four-wheel vehicle and the like.

REFERENCE SIGNS LIST

1: saddled vehicle
4: steering handle
19: seat sensor
37: throttle grip
43: throttle position sensor
103: motor
35: brake lever (brake operating element)
88: parking brake in-operation lamp (display part)
90: transmission
95: parking brake caliper (integrated)
111: parking brake caliper (separate)
200: control unit
204: ignition switch
206: brake pedal (brake operating element)
P: power unit
V: vehicle speed
WF: front wheel
WR: rear wheel

What is claimed is:

1. A parking brake apparatus for a saddled vehicle, comprising:
   a parking brake caliper configured to restrict a rotation of a rear wheel while a saddled vehicle is parked;
   a steering handle configured to steer a front wheel;
   a throttle grip mounted on the steering handle and configured to control output of a power unit;
   a control unit configured to control actuation of the parking brake caliper;
   a regular brake configured to apply braking force to the front wheel and the rear wheel in response to an operation on a brake operating element; and
   a seat sensor configured to detect a seated state of a driver, wherein
   the throttle grip being reversely rotated over a neutral position counter to a forward direction actuates the parking brake caliper, the forward direction being for controlling the output of the power unit,
   the parking brake caliper is electrically driven by a motor,
   the control unit employs an actuation condition for the parking brake caliper that at least a vehicle speed of the saddled vehicle be zero and the throttle grip be reversely rotated,
   the control unit further employs an actuation condition for the parking brake caliper that the brake operating element be rotated,
   the power unit includes a transmission controlled by the control unit, and
   when the vehicle speed of the saddled vehicle is zero; the brake operating element is being operated; the throttle grip is being reversely rotated; and the seat sensor is not detecting the driver being seated, the control unit actuates the parking brake caliper if a gear stage of the transmission is neutral.

2. The parking brake apparatus for a saddled vehicle according to claim 1, wherein the control unit detects the throttle grip being reversely rotated according to information from a throttle position sensor interlocked with the throttle grip.

3. The parking brake apparatus for a saddled vehicle according to claim 2, wherein the saddled vehicle has a cruise control function for keeping the vehicle speed at a set value, and
   when the vehicle speed exceeds zero, the throttle grip being reversely rotated functions to cancel the cruise control function.

4. The parking brake apparatus for a saddled vehicle according to claim 2, further comprising
   an ignition switch configured to turn on and off power supply of the saddled vehicle, wherein the control unit provides selection of a manual mode in which the parking brake caliper is actuated in response to an operation on the throttle grip, and an automatic mode in which the parking brake caliper is actuated according to a predetermined condition without any operation on the throttle grip, and the manual mode or the automatic mode being set is maintained irrespective of an operation on the ignition switch unless the driver performs an operation for switching the mode.

5. The parking brake apparatus for a saddled vehicle according to claim 1, further comprising a seat sensor configured to detect a seated state of a driver, wherein the control unit further employs an actuation condition for the parking brake caliper that the seat sensor detect the driver being seated.

6. The parking brake apparatus for a saddled vehicle according to claim 5, wherein the saddled vehicle has a cruise control function for keeping the vehicle speed at a set value, and when the vehicle speed exceeds zero, the throttle grip being reversely rotated functions to cancel the cruise control function.

7. The parking brake apparatus for a saddled vehicle according to claim 5, further comprising an ignition switch configured to turn on and off power supply of the saddled vehicle, wherein the control unit provides selection of a manual mode in which the parking brake caliper is actuated in response to an operation on the throttle grip, and an automatic mode in which the parking brake caliper is actuated according to a predetermined condition without any operation on the throttle grip, and the manual mode or the automatic mode being set is maintained irrespective of an operation on the ignition switch unless the driver performs an operation for switching the mode.

8. The parking brake apparatus for a saddled vehicle according to claim 1, wherein the saddled vehicle has a cruise control function for keeping the vehicle speed at a set value, and when the vehicle speed exceeds zero, the throttle grip being reversely rotated functions to cancel the cruise control function.

9. The parking brake apparatus for a saddled vehicle according to claim 1, further comprising an ignition switch configured to turn on and off power supply of the saddled vehicle, wherein the control unit provides selection of a manual mode in which the parking brake caliper is actuated in response to an operation on the throttle grip, and an automatic mode in which the parking brake caliper is actuated according to a predetermined condition without any operation on the throttle grip, and the manual mode or the automatic mode being set is maintained irrespective of an operation on the ignition switch unless the driver performs an operation for switching the mode.

10. The parking brake apparatus for a saddled vehicle according to claim 9, further comprising a display part configured to be actuated according to an operation state of the parking brake caliper, wherein when the manual mode is being selected, the control unit causes the display part to transit from a turned-off state to a turned-on state according to the operation of the parking brake caliper, and when the automatic mode is being selected, the control unit further adds a blinking operation of the display part in addition to the turned-on state and the turned-off state.

11. The parking brake apparatus for a saddled vehicle according to claim 10, wherein despite the ignition switch being turned off, the control unit maintains the turned-on state of the display part if the parking brake caliper is in operation.

12. A parking brake apparatus for a saddled vehicle, comprising:

a parking brake caliper configured to restrict a rotation of a rear wheel while a saddled vehicle is parked;

a steering handle configured to steer a front wheel;

a throttle grip mounted on the steering handle and configured to control output of a power unit;

the throttle grip being reversely rotated over a neutral position counter to a forward direction actuates the parking brake caliper, the forward direction being for controlling the output of the power unit;

a control unit configured to control actuation of the parking brake caliper;

a regular brake configured to apply braking force to the front wheel and the rear wheel in response to an operation on a brake operating element; and a seat sensor configured to detect a seated state of a driver, wherein the parking brake caliper is electrically driven by a motor, the control unit employs an actuation condition for the parking brake caliper that at least a vehicle speed of the saddled vehicle be zero and the throttle grip be reversely rotated, the control unit further employs an actuation condition for the parking brake caliper that the brake operating element be rotated, the power unit includes a transmission controlled by the control unit, and when the vehicle speed of the saddled vehicle is zero; the brake operating element is being operated; the throttle grip is being reversely rotated; and the seat sensor is not detecting the driver being seated, the control unit changes a gear stage to neutral and then actuates the parking brake caliper if the gear stage is in an in-gear state other than neutral.

13. The parking brake apparatus for a saddled vehicle according to claim 12, further comprising a seat sensor configured to detect a seated state of a driver, wherein the power unit includes a transmission controlled by the control unit, and when the vehicle speed of the saddled vehicle is zero; the brake operating element is being operated; the throttle grip is being reversely rotated; and the seat sensor is not detecting the driver being seated, the control unit actuates the parking brake caliper if a gear stage of the transmission is neutral.

14. The parking brake apparatus for a saddled vehicle according to claim 13, wherein the saddled vehicle has a cruise control function for keeping the vehicle speed at a set value, and when the vehicle speed exceeds zero, the throttle grip being reversely rotated functions to cancel the cruise control function.

15. The parking brake apparatus for a saddled vehicle according to claim 2, further comprising an ignition switch configured to turn on and off power supply of the saddled vehicle, wherein the control unit provides selection of a manual mode in which the parking brake caliper is actuated in response to an operation on the throttle grip, and an automatic mode in which the parking brake caliper is actuated according to a predetermined condition without any operation on the throttle grip, and the manual mode or the automatic mode being set is maintained irrespective of an operation on the ignition switch unless the driver performs an operation for switching the mode.

16. A parking brake apparatus for a saddled vehicle, comprising:

a parking brake caliper configured to restrict a rotation of a rear wheel while a saddled vehicle is parked;

a steering handle configured to steer a front wheel;

a throttle grip mounted on the steering handle and configured to control output of a power unit, a control unit configured to control actuation of the parking brake caliper;

an ignition switch configured to turn on and off power supply of the saddled vehicle; and a display part configured to be actuated according to an operation state of the parking brake caliper, wherein the throttle grip being reversely rotated over a neutral position counter to a forward direction actuates the parking brake caliper, the forward direction being for controlling the output of the power unit, the parking brake caliper is electrically driven by a motor, the control unit employs an actuation condition for the parking brake caliper that at least a vehicle speed of the saddled vehicle be zero and the throttle grip be reversely rotated, the control unit provides selection of a manual mode in which the parking brake caliper is actuated in response to an operation on the throttle grip, and an automatic mode in which the parking brake caliper is actuated according to a predetermined condition without any operation on the throttle grip, the manual mode or the automatic mode being set is maintained irrespective of an operation on the ignition switch unless the driver performs an operation for switching the mode, when the manual mode is being selected, the control unit causes the display part to transit from a turned-off state to a turned-on state according to the operation of the parking brake caliper, and when the automatic mode is being selected, the control unit further adds a blinking operation of the display part in addition to the turned-on state and the turned-off state.

17. The parking brake apparatus for a saddled vehicle according to claim 16, further comprising a regular brake configured to apply braking force to the front wheel and the rear wheel in response to an operation on a brake operating element, wherein the control unit further employs an actuation condition for the parking brake caliper that the brake operating element be rotated.

18. The parking brake apparatus for a saddled vehicle according to claim 17, further comprising a seat sensor configured to detect a seated state of a driver, wherein the power unit includes a transmission controlled by the control unit, and when the vehicle speed of the saddled vehicle is zero; the brake operating element is being operated; the throttle grip is being reversely rotated; and the seat sensor is not detecting the driver being seated, the control unit changes a gear stage to neutral and then actuates the parking brake caliper if the gear stage is in an in-gear state other than neutral.

19. The parking brake apparatus for a saddled vehicle according to claim 18, wherein the saddled vehicle has a cruise control function for keeping the vehicle speed at a set value, and when the vehicle speed exceeds zero, the throttle grip being reversely rotated functions to cancel the cruise control function.

20. The parking brake apparatus for a saddled vehicle according to claim 16, wherein the saddled vehicle has a cruise control function for keeping the vehicle speed at a set value, and when the vehicle speed exceeds zero, the throttle grip being reversely rotated functions to cancel the cruise control function.

* * * * *